(12) United States Patent
Kusakabe et al.

(10) Patent No.: US 7,177,463 B2
(45) Date of Patent: Feb. 13, 2007

(54) IMAGE PROCESSING APPARATUS AND METHOD

(75) Inventors: Minoru Kusakabe, Kanagawa (JP); Nobutaka Miyake, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/297,417

(22) Filed: Dec. 9, 2005

(65) Prior Publication Data

US 2006/0088211 A1 Apr. 27, 2006

Related U.S. Application Data

(62) Division of application No. 10/601,772, filed on Jun. 24, 2003, now Pat. No. 7,103,214.

(30) Foreign Application Priority Data

Jun. 28, 2002 (JP) .............................. 2002-191131

(51) Int. Cl.
*G06K 9/00* (2006.01)
(52) U.S. Cl. .................. 382/162; 382/262; 382/264
(58) Field of Classification Search ................ 382/162, 382/164, 262, 264, 275
See application file for complete search history.

(56) References Cited

U.S. PATENT DOCUMENTS

| | | | |
|---|---|---|---|
| 4,689,666 A | 8/1987 | Hatanaka | 348/624 |
| 6,807,300 B1 | 10/2004 | Gindele et al. | 382/275 |
| 6,882,754 B2 | 4/2005 | Hayashi | 382/275 |
| 2003/0063144 A1 | 4/2003 | Kusakabe et al. | 347/15 |
| 2003/0228067 A1 | 12/2003 | Miyake et al. | 382/275 |
| 2005/0031223 A1 | 2/2005 | Kusakabe et al. | 382/275 |

FOREIGN PATENT DOCUMENTS

| | | |
|---|---|---|
| JP | 07-203210 A | 8/1995 |
| JP | 9-238261 | 9/1997 |
| JP | 2002-10108 | 1/2002 |

*Primary Examiner*—Phuoc Tran
(74) *Attorney, Agent, or Firm*—Fitzpatrick, Cella, Harper & Scinto

(57) ABSTRACT

A surrounding pixel reference unit reads out and stores image data having a predetermined size from a line buffer. A color judgment unit detects the color of the image (reference image) stored in the surrounding pixel reference unit. A parameter determination unit determines parameters used in an individual noise removal unit on the basis of the color detected by the color judgment unit, and supplies them to the individual noise removal unit. The individual noise removal unit reads out, from the line buffer, an image which is located at the same position as that read out by the surrounding pixel reference unit and has a size according to the parameters supplied from the parameter determination unit, and executes a noise removal process for the readout image in accordance with the parameters supplied from the parameter determination unit.

7 Claims, 15 Drawing Sheets

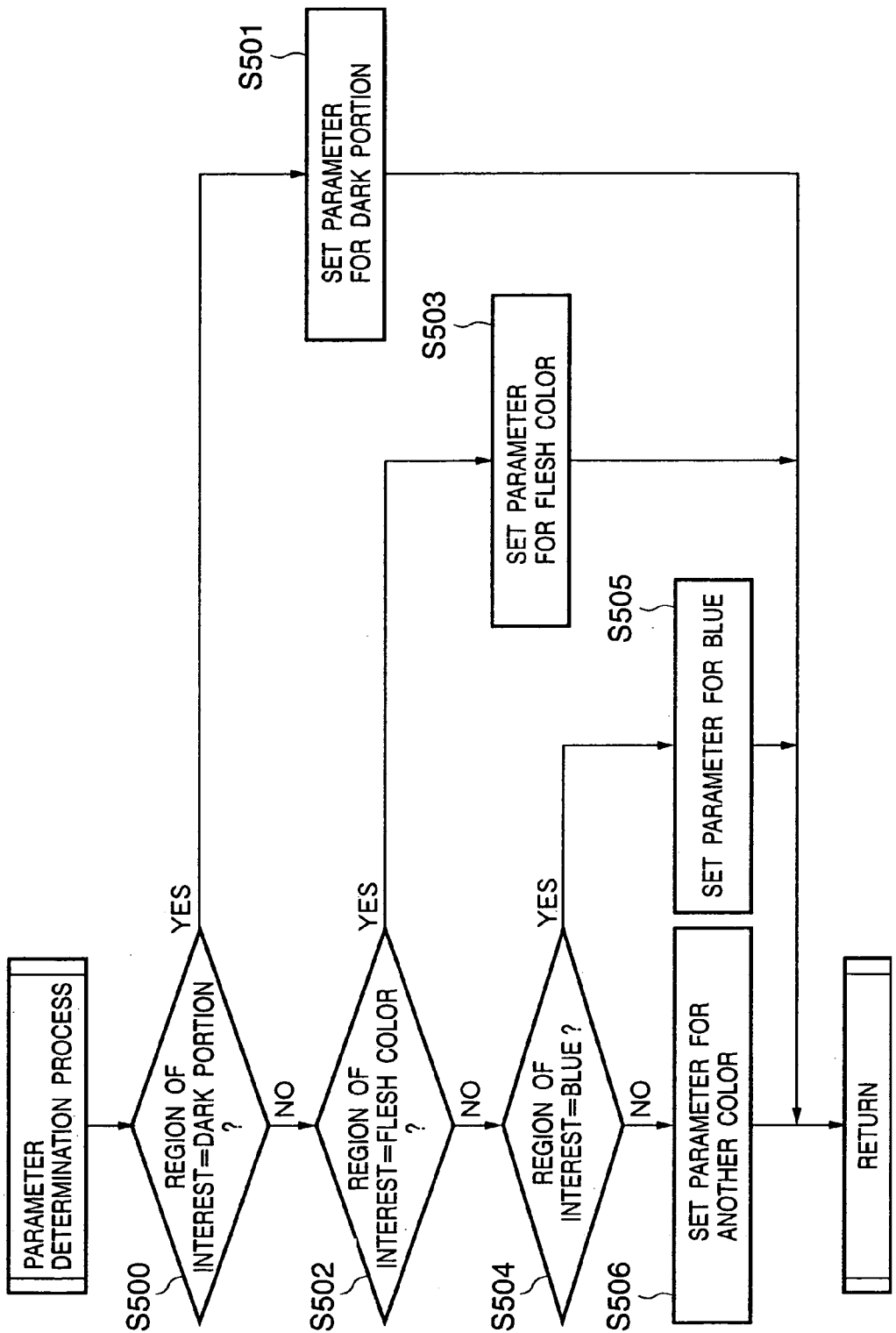

701  700

703  702

703  702

FIG. 8A
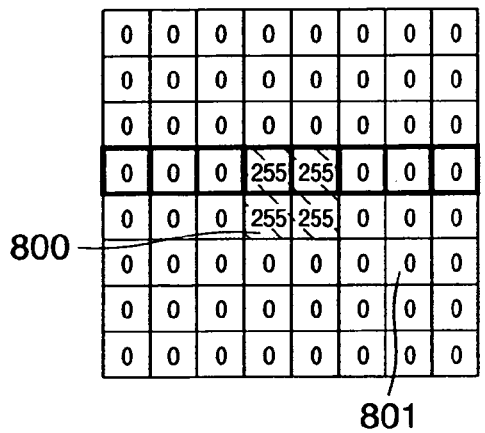
FIG. 8B
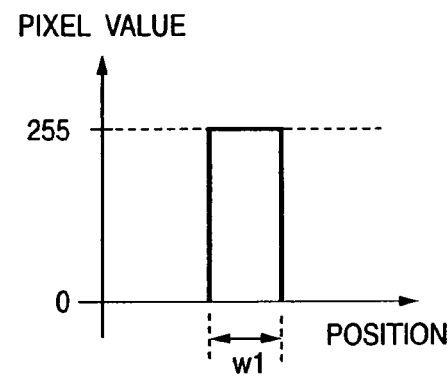
FIG. 8C  FIG. 8D
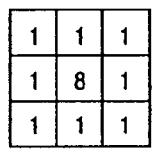
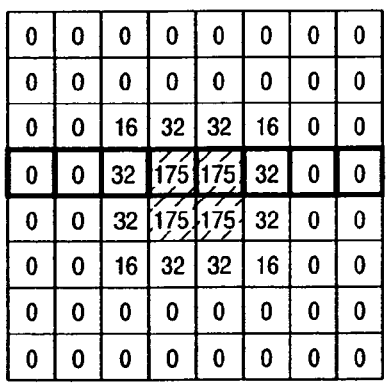
FIG. 8E
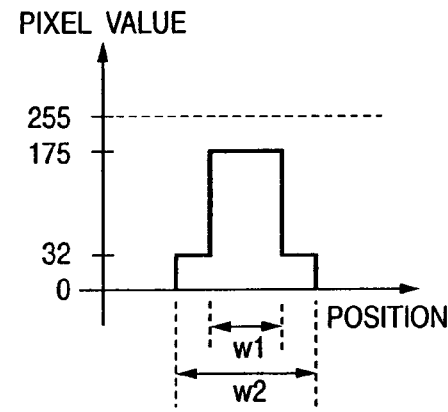
FIG. 8F  FIG. 8G
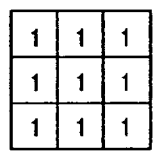
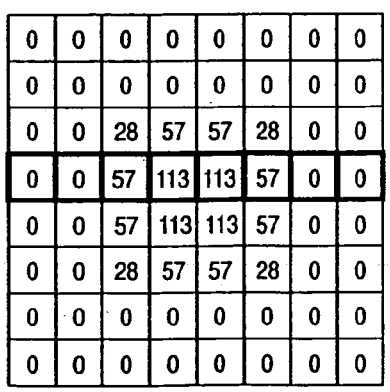
FIG. 8H
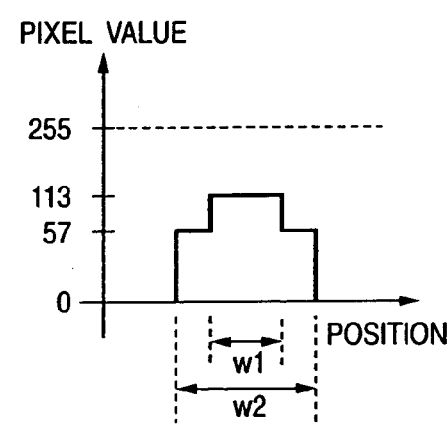

1100  1101

1100  1101

1201  1200

1201  1200

FIG. 13A  FIG. 13B
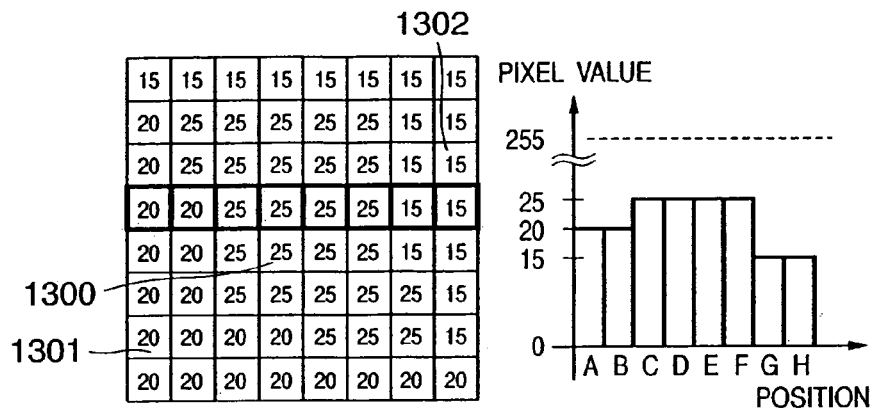
FIG. 13C
|Porg−Psel|≤Th1
(Th1=8)
FIG. 13D  FIG. 13E
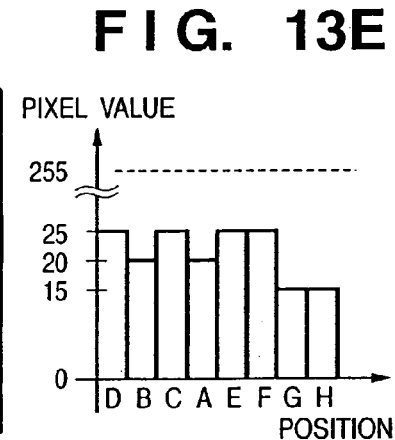
FIG. 13F
|Porg−Psel|≤Th2
(Th2=12)
FIG. 13G  FIG. 13H
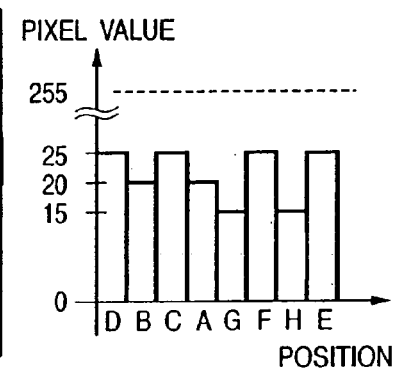

| 144 | 20 | 23 | 20 | 20 | 20 | 22 | 20 |
|---|---|---|---|---|---|---|---|
| 20 | 20 | 137 | 22 | 23 | 20 | 20 | 169 |
| 23 | 21 | 30 | 28 | 30 | 180 | 21 | 20 |
| 20 | 23 | 32 | 130 | 27 | 28 | 175 | 21 |
| 157 | 23 | 29 | 27 | 30 | 29 | 20 | 20 |
| 20 | 20 | 28 | 210 | 31 | 28 | 21 | 190 |
| 21 | 211 | 26 | 29 | 30 | 28 | 165 | 24 |
| 22 | 21 | 21 | 20 | 183 | 20 | 23 | 23 |

1701, 1700

| 144 | 20 | 23 | 20 | 20 | 20 | 22 | 20 |
|---|---|---|---|---|---|---|---|
| 20 | 20 | 137 | 22 | 30 | 20 | 20 | 189 |
| 23 | 21 | 30 | 26 | 23 | 180 | 21 | 20 |
| 20 | 32 | 23 | 130 | 27 | 28 | 175 | 21 |
| 157 | 23 | 29 | 27 | 20 | 29 | 30 | 20 |
| 20 | 20 | 28 | 210 | 31 | 28 | 21 | 190 |
| 21 | 211 | 26 | 21 | 30 | 23 | 165 | 24 |
| 22 | 21 | 29 | 20 | 183 | 20 | 28 | 23 |

1700

| 20 | 20 | 23 | 20 | 20 | 20 | 22 | 20 |
|---|---|---|---|---|---|---|---|
| 20 | 20 | 22 | 22 | 23 | 20 | 20 | 21 |
| 23 | 21 | 30 | 26 | 30 | 27 | 21 | 20 |
| 20 | 23 | 32 | 30 | 27 | 28 | 21 | 21 |
| 20 | 23 | 29 | 27 | 30 | 29 | 20 | 20 |
| 20 | 20 | 28 | 29 | 31 | 28 | 21 | 24 |
| 21 | 21 | 26 | 29 | 30 | 28 | 26 | 24 |
| 22 | 21 | 21 | 20 | 28 | 20 | 23 | 23 |

1700

| 20 | 20 | 26 | 20 | 20 | 20 | 22 | 20 |
|---|---|---|---|---|---|---|---|
| 30 | 20 | 22 | 22 | 30 | 20 | 20 | 21 |
| 23 | 21 | 20 | 23 | 23 | 27 | 21 | 28 |
| 20 | 32 | 23 | 30 | 27 | 20 | 21 | 21 |
| 27 | 23 | 29 | 20 | 20 | 29 | 30 | 20 |
| 20 | 29 | 28 | 20 | 31 | 24 | 21 | 28 |
| 21 | 21 | 22 | 21 | 30 | 23 | 26 | 24 |
| 26 | 21 | 29 | 20 | 28 | 20 | 23 | 28 |

1700

IMAGE PROCESSING APPARATUS AND METHOD

CROSS REFERENCE TO RELATED APPLICATION

This application is a division of application Ser. No. 10/601,772, filed on Jun. 24, 2003, now U.S. Pat. No. 7,103,214, the entire disclosure of which hereby is incorporated by reference herein.

FIELD OF THE INVENTION

The present invention relates to an image processing apparatus and method, which can remove noise from an image on which noise is superposed.

BACKGROUND OF THE INVENTION

Conventionally, a technique for removing noise components from a digital image on which noise components that are different from signal components are superposed has been studied. The characteristics of noise to be removed are diverse depending on their generation factors, and noise removal methods suited to those characteristics have been proposed. For example, when an image input device such as a digital camera, image scanner, or the like is assumed, noise components are roughly categorized into noise which depends on the input device characteristics of a solid-state image sensing element or the like and input conditions such as an image sensing mode, scene, or the like, and has already been superposed on a photoelectrically converted analog original signal, and noise which is superposed via various digital signal processes after the analog signal is converted into a digital signal via an A/D converter.

As an example of the former, impulse noise that generates an isolated value to have no correlation with surrounding image signal values, noise resulting from the dark current of the solid-state image-sensing element, and the like are known. As an example of the latter, noise components are amplified simultaneously with signal components when a specific density, color, and the like are emphasized in various correction processes such as gamma correction, gain correction for improving the sensitivity, and the like, thus increasing the noise level. As an example of deterioration due to a digital signal process, since an encoding process using a JPEG algorithm extracts a plurality of blocks from a two-dimensional (2D) image, and executes orthogonal transformation and quantization for respective blocks, a decoded image suffers block distortion that generates steps at the boundaries of blocks.

In addition to various kinds of noise mentioned above, a factor that especially impairs the image quality is noise (to be referred to as "low-frequency noise" hereinafter) which is generated in a low-frequency range and is conspicuously observed in an image sensed by a digital camera or the like. This low-frequency noise often results from the sensitivity of a CCD or CMOS sensor as a solid-state image sensing element. In an image sensing scene such as a dark scene with a low signal level, a shadowy scene, or the like, low-frequency noise is often emphasized due to gain correction that raises signal components irrespective of poor S/N ratio. Furthermore, the element sensitivity of the solid-state image sensing element depends on its chip area. Hence, in a digital camera which has a large number of pixels within a small area, the amount of light per unit pixel consequently decreases, and the sensitivity lowers, thus producing noise.

Such low-frequency noise is often visually recognized as pseudo mottled texture across several to ten-odd pixels on a flat portion such as a sheet of blue sky or the like. Some digital cameras often produce false colors.

As a conventionally proposed noise removal method, a method using a median filter (to be abbreviated as "MF" hereinafter) which extracts a pixel value which assumes a median from those of a pixel of interest and its surrounding pixels, and replaces the pixel value of interest by the extracted value is prevalent.

Also, as a noise removal method effective for impulse noise, block distortion mentioned above, and the like, a method using a low-pass filter (to be abbreviated as "LPF" hereinafter) which calculates the weighted mean using the pixel values of a pixel of interest and its surrounding pixels, and replaces the pixel value of interest by the calculated weighted mean is used. Furthermore, as a noise removal method effective for low-frequency noise, a method of replacing a pixel value of interest by a pixel value which is probabilistically selected from those around the pixel of interest (to be referred to as a "noise distribution method" hereinafter) has been proposed.

As described above, noise components superposed on an image are influenced by various causes. For example, a digital camera suffers multiple causes, i.e., noise superposed on an analog original signal depending on, e.g., the input device characteristics of a solid-state image sensing element or the like is further amplified by various digital image processes executed after the analog original signal is converted into a digital signal via an A/D converter.

In digital image processes executed by a digital camera, typical processes which are involved in noise generation and amplification include white balance correction, gain correction for improving the sensitivity, saturation correction which is executed for specific colors to simulate memory colors, and the like.

The white balance correction corrects a phenomenon that an originally white image does not appear white due to total color unbalance which is caused since the amounts of light components that reach an image sensing element via color filters differ depending on the filter colors, or the number of pixels of an image sensing element adopted per pixel of an output image differs for respective colors.

The gain correction for improving the sensitivity compensates for an insufficient amount of light by amplifying signal information of either an analog signal obtained from an image sensing element or a digital signal after A/D conversion, so as to allow a photographing operation even when the amount of light in a photographing environment is insufficient.

The saturation correction corrects, e.g., the saturation of blue to vividly express the color of clear sky, so as to obtain a preferred image by making colors in an image simulate colors in one's memory.

In the conventional method, flatness in an image is detected, and a noise removal process with a relatively high effect is applied to a flat portion. On the other hand, a noise removal process with a relatively low effect is applied to an edge portion or a process is skipped so as to minimize adverse effects.

However, as described above, the nature of noise superposed on an image signal does hot depend on the flatness of an image. For this reason, with the conventional method, when a noise removal process that can sufficiently remove noise is applied to a given region, other regions suffer high noise level, and noise cannot be sufficiently removed. Furthermore, the adverse effects of the noise removal process may be visually conspicuous in other regions.

The present invention has been made in consideration of the aforementioned problems, and has as its object to provide an image processing apparatus and method, which can execute a noise removal process more effectively.

SUMMARY OF THE INVENTION

In order to achieve the above object, for example, an image processing apparatus of the present invention comprises the following arrangement.

That is, an image processing apparatus comprising:

judgment means for judging a color of an image for each region having a predetermined size in an image superposed with noise;

determination means for determining a parameter for a noise removal process in correspondence with the color determined by the judgment means; and control means for controlling execution of the noise removal process in accordance with the parameter determined by the determination means.

In order to achieve the above object, for example, an image processing method of the present invention comprises the following arrangement.

That is, an image processing method comprising:

a judgment step of judging a color an image for each region having a predetermined size in an image superposed with noise;

a determination step of determining a parameter for a noise removal process in correspondence with the color determined in the judgment step; and a control step of controlling execution of the noise removal process in accordance with the parameter determined in the determination step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a flow chart showing details of the process for determining parameters in step S203;

FIG. 8A shows an image to be processed;

FIG. 8B shows a change in pixel value upon plotting one line bounded by a bold frame in FIG. 8A along the abscissa;

FIG. 8C shows the first example of weights used upon calculating a weighted mean in an LPF process;

FIG. 8D shows pixel values as a result of an LPF process which is applied to the image in FIG. 8A using the weights shown in FIG. 8C;

FIG. 8E shows a change in pixel value upon plotting one line bounded by a bold frame in FIG. 8D along the abscissa;

FIG. 8F shows the second example of weights used upon calculating a weighted mean in an LPF process;

FIG. 8G shows pixel values as a result of an LPF process which is applied to the image in FIG. 8A using the weights shown in FIG. 8F;

FIG. 8H shows a change in pixel value upon plotting one line bounded by a bold frame in FIG. 8G along the abscissa;

FIG. 13A shows an image to be processed;

FIG. 13B shows a change in pixel value upon plotting one line bounded by a bold frame in FIG. 13A along the abscissa;

FIG. 13C shows an example of a formula that represents a pixel value substitution condition used in the noise distribution process;

FIG. 13D shows a result of the noise distribution process applied to FIG. 13A as the image to be processed on the basis of the formula in FIG. 13C;

FIG. 13E shows pixel values in one line bounded by a bold frame in FIG. 13D;

FIG. 13F shows another example of a formula that represents a pixel value substitution condition used in the noise distribution process;

FIG. 13G shows a result of the noise distribution process applied to FIG. 13A as the image to be processed on the basis of the formula in FIG. 13F;

FIG. 13H shows pixel values in one line bounded by a bold frame in FIG. 13G;

DETAILED DESCRIPTION OF THE PREFERRED EMBODIMENTS

Preferred embodiments of the present invention will now be described in detail in accordance with the accompanying drawings.

In embodiments to be described hereinafter, each process for reducing noise from an image on which noise is superposed is called a "noise removal process", and this process has a purpose of not completely removing noise from an image but reducing noise to a visually imperceptible level.

First Embodiment

Figure 1:
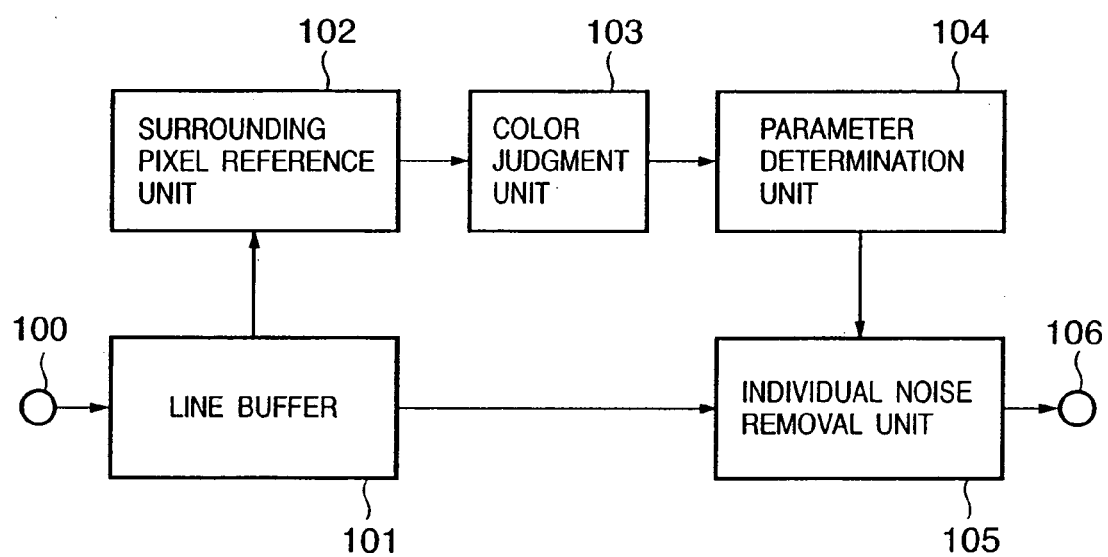
FIG. 1 is a block diagram showing the functional arrangement of an image processing apparatus according to an embodiment of the present invention.

FIG. 1 is a block diagram showing the functional arrangement of an image processing apparatus according to this embodiment. The image processing apparatus shown in FIG. 1 comprises an input terminal 100, line buffer 101, surrounding pixel reference unit 102, color judgment unit 103, parameter determination unit 104, individual noise removal unit 105, and output terminal 106.

The input terminal 100 receives color image data (to be referred to as image data simply or as original image data hereinafter) formed of R, G, and B color signals, and outputs the image data to the line buffer 101 to be described below. The line buffer 101 stores and holds the input image data for respective lines. The surrounding pixel reference unit 102 comprises line buffers for several lines, and stores image data for a predetermined size sequentially read out from the image data stored in the line buffer 101.

The color judgment unit 103 refers to image data held by the surrounding pixel reference unit 102 to detect an image color indicated by that image data. The color detection method will be described later. The parameter determination unit 104 determines parameters used in a noise removal process to be executed by the next individual noise removal unit 105 on the basis of the detection result of the color judgment unit 103, and supplies the determined parameters to the individual noise removal unit 105. The individual noise removal unit 105 can execute a noise removal process using a noise removal method such as an MF method, LPF method, noise distribution method, or the like, and applies the noise removal process to the image supplied from the line buffer 101 in accordance with the parameters supplied from the parameter determination unit 104. The image that has undergone the noise removal process is externally output via the output terminal 106.

Figure 2:
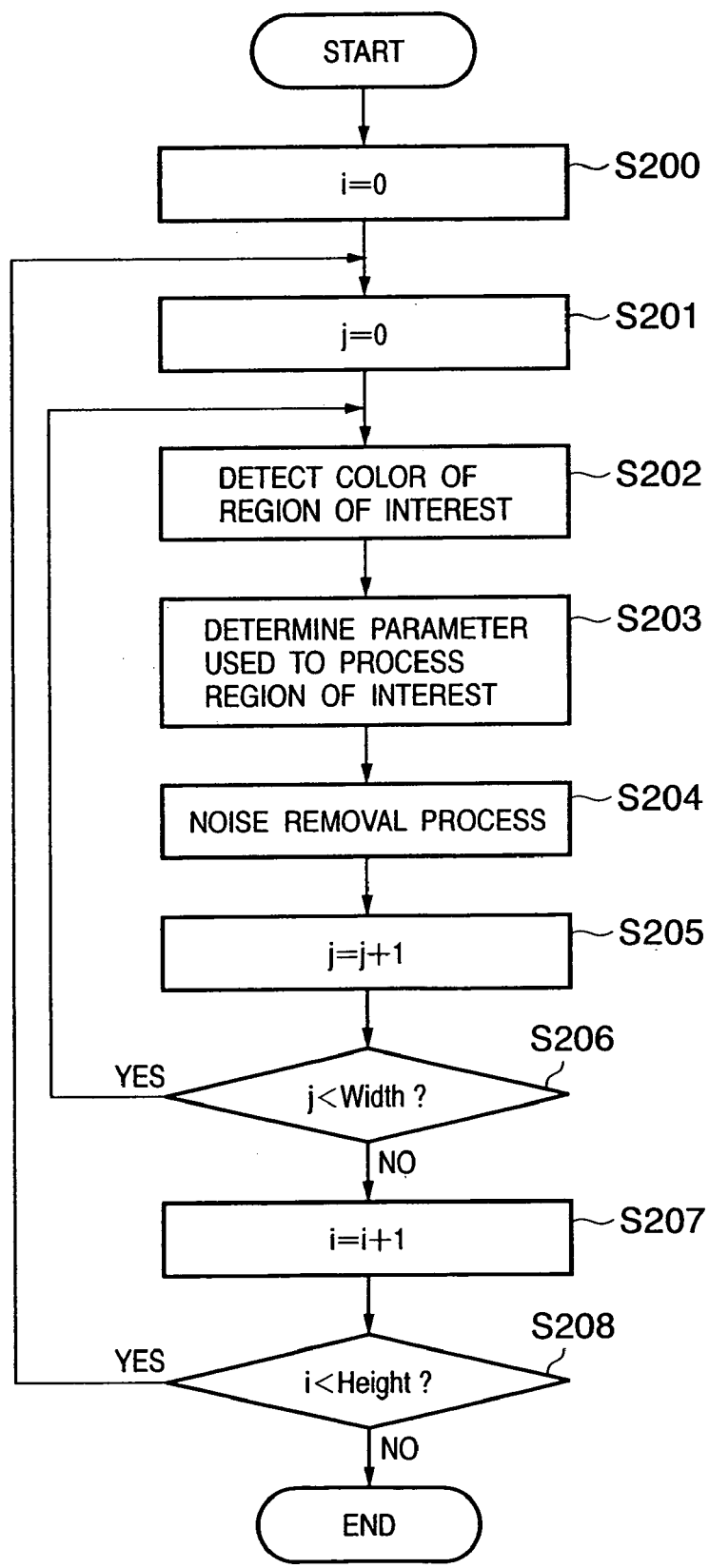
FIG. 2 is a flow chart of a noise removal process executed by an image processing apparatus according to the first embodiment of the present invention.

The noise removal process executed by the image processing apparatus with the above arrangement will be described below with reference to FIG. 2 which is a flow chart of that process.

Note that a computer may function as an image processing apparatus according to this embodiment by loading an image processing program as a program group which implements the functions of the respective units shown in FIG. 1, and executing the noise removal process. In this case, FIG. 1 shows the functional arrangement of the image processing program. Also, in this case, FIG. 2 shows a flow chart of the process that the image processing program makes the computer execute. As the sizes of an image to be input to the image processing apparatus, the number of horizontal pixels is represented by Width, and the number of vertical pixels is represented by Height.

Variable i which indicates the vertical address of each pixel that forms an input image, and variable j that indicates its horizontal address are respectively reset to zero (steps S200 and S201). The surrounding pixel reference unit 102 reads out image data (reference image data) having a predetermined size to have a position (j, i) as the center from the line buffer 101, and stores the readout data. At the same time, the color judgment unit 103 detects the color of the reference image (step S202).

As a color detection method, for example, the average densities of respective colors in pixels included in the reference image are calculated, and the color of the reference image is detected on the basis of a combination of the average densities of respective colors.

When the reference image includes an edge (the boundary between different color regions), a color defined by the combination does not often normally reflect the color of the reference image. In such case, the reference image may be further divided into sub-images to avoid respective color regions from being included in one image, and each divided sub-image may undergo the color determination. In this case, the color determination unit 103 sends a message indicating that the reference image is further divided into sub-images to the subsequent parameter determination unit 104 and individual noise removal unit 105.

The parameter determination unit 104 determines parameters used in the individual noise removal unit 105 on the basis of the color detected by the color judgment unit 103, and supplies them to the next individual noise removal unit 105 (step S203). When the reference image is further divided into sub-images in step S202, as described above, the parameter determination unit 104 determines parameters for each divided sub-image, and supplies the determined parameters to the individual noise removal unit 105.

The individual noise removal unit 105 reads out an image (image to be processed), which is located at the same position (the same image central position) as the reference image and has a size according to the parameters supplied from the parameter determination unit 104, from the line buffer 101. The unit 105 then executes a noise removal process of the readout image according to the parameters supplied from the parameter determination unit 104 using predetermined one of noise removal methods such as an MF method, LPF method, noise distribution method, and the like (step S204). When the reference image is further divided into sub-images in step S202, as described above, the individual noise removal unit 105 executes a noise removal process for each divided sub-image.

The horizontal address j is counted up by 1 to move the position of the image to be processed one pixel to the right (step S205), and it is then checked if the address j is smaller than Width (step S.206). The processes in steps S202 to S205 are repeated as long as j<Width.

On the other hand, if j≧Width, the flow advances from step S206 to step S207, and the vertical address i is counted up by one to move the position of the image to be processed one pixel downward (step S207). It is then checked if the address i is smaller than Height (step S208) The processes in steps S201 to S207 are repeated as long as i<Height. If i≧Height, the aforementioned processes end.

Figure 3:
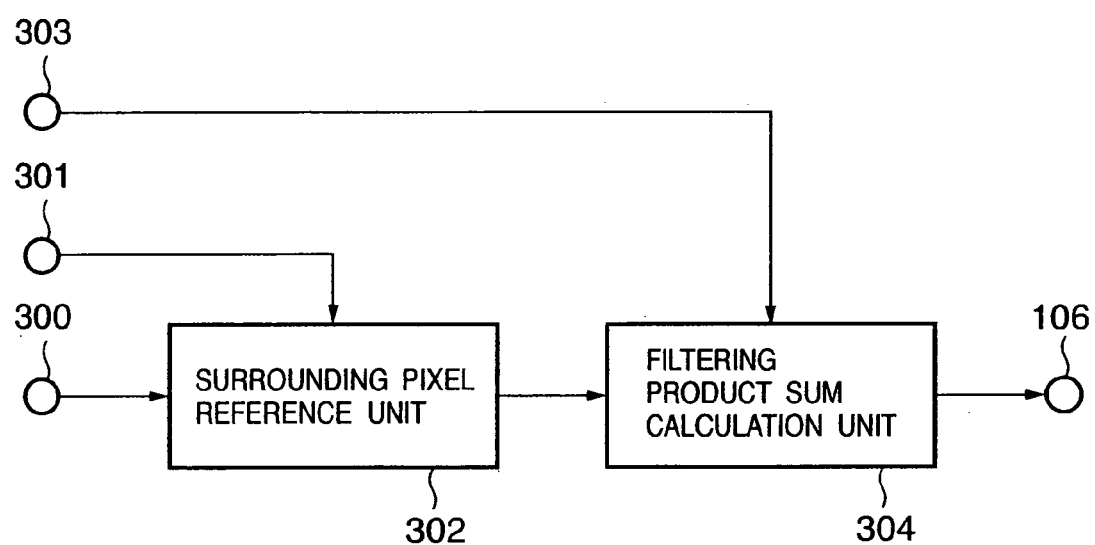
FIG. 3 is a block diagram showing the functional arrangement of an individual noise removal unit 105 upon executing a noise removal process using an LPF.

The individual noise removal unit 105 will be described below. FIG. 3 shows the functional arrangement of the individual noise removal unit 105 when a noise removal process is executed using the aforementioned LPF method. Note that the same reference numerals in FIG. 3 denote the same parts as those in FIG. 1, and a description thereof will be omitted.

The individual noise removal unit 105 shown in FIG. 3 comprises input terminals 300, 301, and 303, surrounding pixel reference unit 302, and filtering product sum calculation unit 304. The input terminal 300 receives an image from the line buffer 301. The input terminal 301 receives information which is included in the parameters supplied from the parameter determination unit 104 and indicates the size of a region that is to undergo a noise removal process. The input terminal 303 receives the parameters which are supplied from the parameter determination unit 104 and are used in a filtering process. The surrounding pixel reference unit 302 stores an image having a size according to the parameter supplied from the parameter determination unit 104 in the image (an image at the same position as the reference image in the original image) input via the input terminal 300.

The filtering product sum calculation unit 304 executes a process for calculating a weighted mean of the pixel values of the image held by the surrounding pixel reference unit 302 using the parameters input via the input terminal 303, and replacing the pixel value of the pixel of interest by the calculated weighted mean.

Figure 4:
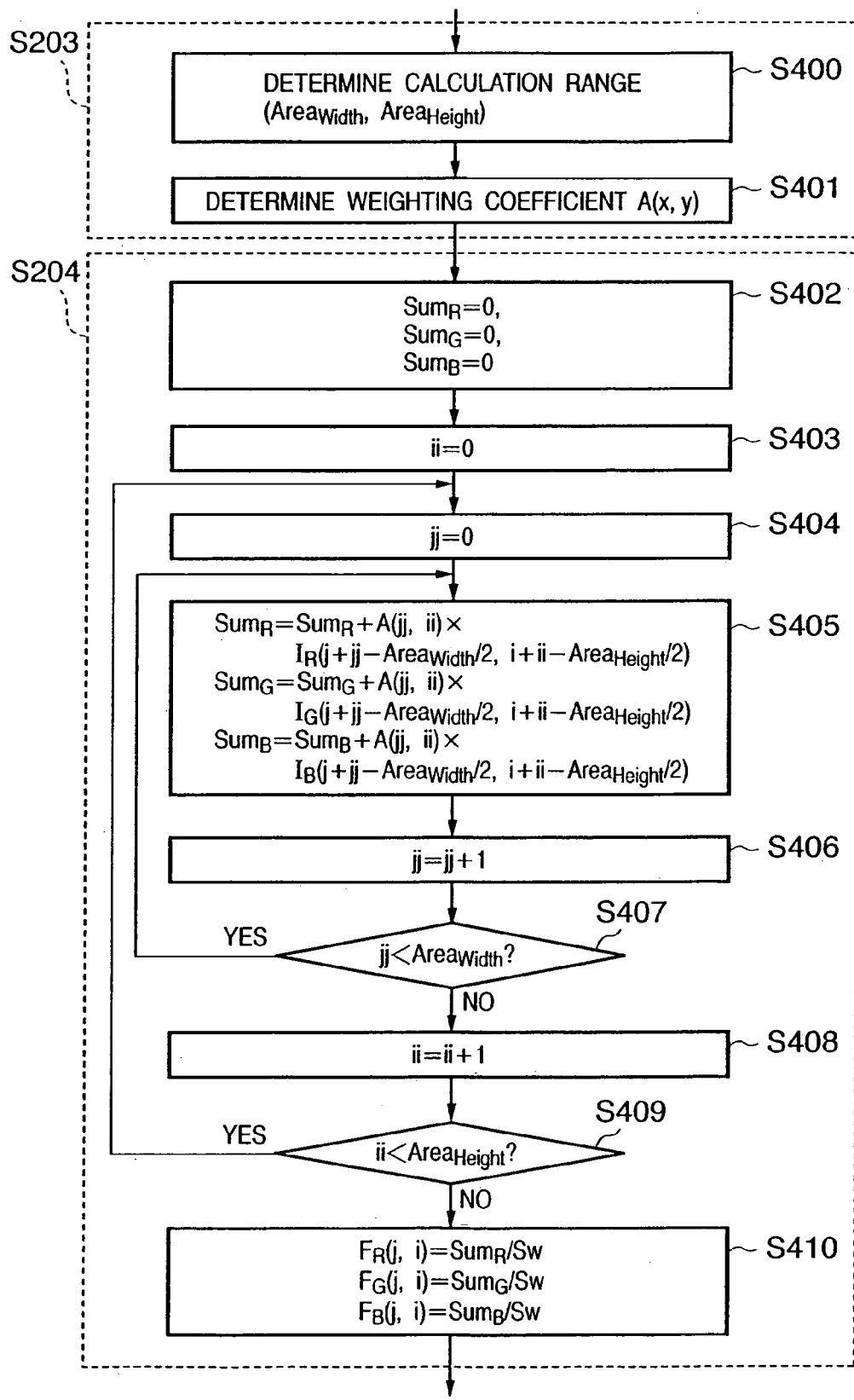
FIG. 4 is a flow chart of a noise removal process executed by the image processing apparatus shown in FIG. 1 when the arrangement shown in FIG. 3 is applied to the individual noise removal unit 105.

FIG. 4 is a flow chart of a noise removal process executed by the image processing apparatus shown in FIG. 1 when the arrangement shown in FIG. 3 is applied to the individual noise removal unit 105. The noise removal process will be described below using the flow chart in FIG. 4. Note that ranges bounded by the broken lines in FIG. 4 respectively indicate the processes executed in steps S203 and S204, and the processes other than steps S203 and S204 are not shown in FIG. 4. That is, FIG. 4 is a flow chart showing details of the parameter determination process in step S203, and the noise removal process in step S204.

The size of an image to be processed (calculation range) is obtained based on the color detection result of the color judgment unit 103 (step S400). Note that sizes which are experimentally determined in advance in accordance with effects or adverse effects to be described later are held in a table or the like as calculation ranges, and are selected on the basis of the color detection result. In the following description, let $Area_{Width}$ be the horizontal size (the number of pixels) of the calculation range, and $Area_{Height}$ be the vertical size (the number of pixels).

Then, weighting coefficients A(x, y) used upon calculating a weighted mean using the pixel values of pixels within the calculation range are determined (step S401). Note that respective weighting coefficients A(x, y) correspond to pixels which form the image in the calculation range. Values which are experimentally determined in advance in accordance with effects or adverse effects to be described later are held in a table or the like as weighting coefficients A(x, y), and are selected on the basis of the color detection result. With the processes in steps S400 and S401, the parameter determination process is implemented.

The noise removal process is then executed. All variables $Sum_R$, $Sum_G$, and $Sum_B$ which correspond to R, G, and B in respective pixels in the calculation range and are used in subsequent processes are reset to zero (step S402).

Variable ii that indicates the vertical processing address of each pixel which forms the image within the calculation range is reset to zero (step S403). Likewise, variable jj that indicates the horizontal processing address of each pixel which forms the image within the calculation range is reset to zero (step S404).

In each pixel which forms the image within the calculation range, product sum calculations of $I_R$, $I_G$, and $I_B$ indicating R, G, and B pixel values and weighting coefficient A are made to obtain R, G, and B cumulative sum values (step S405). Then, variable jj indicating the horizontal address is counted up by one to move the pixel position which is to undergo product sum calculations one pixel to the right (step S406). The processes in steps S405 and S406 are repeated until jj≧$Area_{Width}$ (step S407).

Variable ii indicating the vertical address is counted up by one to move the pixel position which is to undergo product sum calculations one pixel downward (step S408). The processes in steps S404 to S408 are repeated until ii≧$Area_{Height}$.

With the above processes, product sum values $Sum_R$, $Sum_G$, and $Sum_B$ of all pixels which form the image in the calculation range and weighting coefficients can be obtained. Then, the average values of these product sum values $Sum_R$, $Sum_G$, and $Sum_B$ in the image within the calculation range are calculated (step S410). That is, each product sum value is divided by a sum total $S_w=\Sigma_y\Sigma_x A(x, y)$ of weights (where $\Sigma_a f(a)$ is the sum total of f(a) of all "a"s.

The respective quotients replace the R, G, and B pixel values of the pixel of interest as values Fr(j, i), Fg(j, i), and Fb(j, i).

In the above process, identical weighting coefficients are used for R, G, and B components. Alternatively, different weighting coefficients may be generated for respective components. In such case, the weighted mean calculation process in steps S402 to S410 is executed using individual weights for an individual calculation range of each component.

In the description of the above process, an image is made up of R, G, and B components. However, the above process may be applied to luminance and color difference components used in JPEG or the like, or complementary color components such as C, M, Y, and K components or the like used as ink colors in a printer or the like.

The detailed process for determining parameters in step S203 will be described below with reference to FIG. 5 which is a flow chart of that process. This process may be applied to the-process for obtaining weighting coefficients in step S401.

If it is determined as a result of color detection of the color judgment unit 103 that the region of interest is a dark portion (step S500), the flow advances to step S501 to set parameters for the dark portion (step S501). On the other hand, if it is determined that the color of the region of interest is flesh color (step S502), the flow advances to step S503 to set parameters for flesh color. Also, if it is determined that the color of the region of interest is blue (step S504), the flow advances to step S505 to set parameters for blue (step S505). If it is determined that the color of the region of interest is none of the above colors, the flow advances to step S506 to set parameters for other colors (step S506). Upon completion of the aforementioned processes, the flow advances to step S204.

Note that the detection process is executed in the order of dark portion→flesh color→blue. However, the present invention is not limited to such specific order, and is not limited to these colors.

Figure 6A:
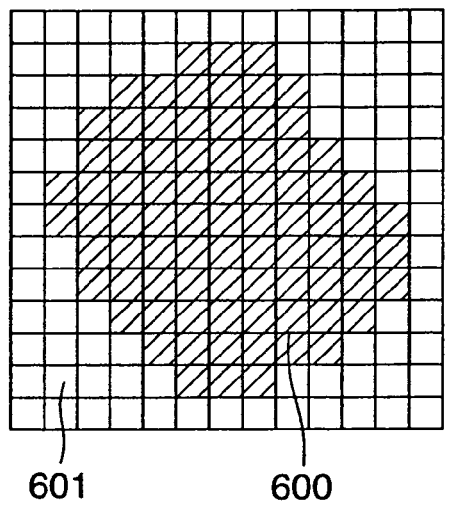
FIG. 6A shows an example of noise superposed on an image.

The color of the region of interest, and the effect and adverse effect of the noise removal process will be explained below. FIG. 6A shows an example of noise superposed on an image. A hatched pixel region 600 includes pixels that contain noise components, and is present in an image as a cluster of several to ten-odd successive pixels. A white pixel region 601 corresponds to that other than noise components.

Figure 6B:
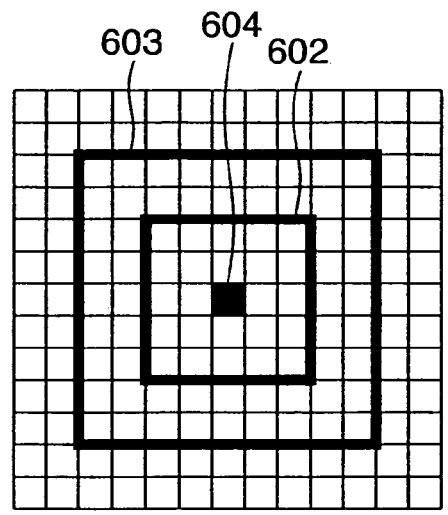
FIG. 6B show processing ranges of an LPF process, in which two bold frames 602 and 603 indicate LPF processing ranges having a pixel 604 as a pixel of interest.

FIG. 6B shows the processing range of the LPF process. Regions 602 and 603 within two bold frames indicate LPF processing ranges which have a pixel 604 as a pixel of interest. Note that the region 602 indicates a 5×5 pixel processing range, and the region 603 indicates a 9×9 pixel, processing range.

Figure 6C:
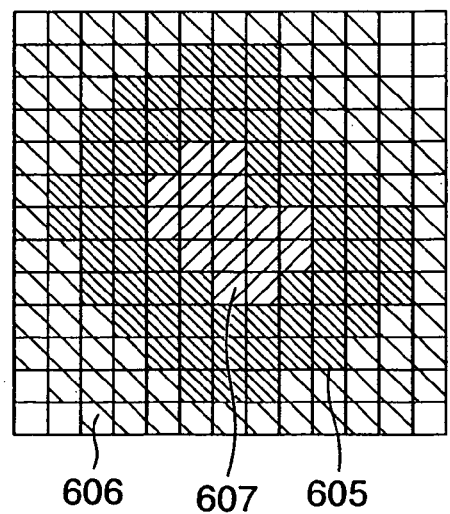
FIG. 6C shows an image state as a result of an LPF process which is applied to the image containing noise in FIG. 6A to have the range 602 of 5 pixels×5 pixels as a processing range.

FIG. 6C shows the state of an image as a result of the LPF process which is applied to the image containing noise shown in FIG. 6A using the 5×5 pixel range 602 as the processing range. A black pixel region 605 indicates a region where noise components are attenuated. Also, a gray pixel region 606 indicates a region where noise components are diffused by the LPF process although it is originally free from any noise components. A hatched pixel region 607 indicates a region where the effect of the processing is small due to an insufficient processing range size compared to the noise range. In the region 607, since the LPF process is done within the noise range, the weighted mean of noise components is calculated, and the effect of attenuating noise components is small. On the other hand, in the region 605, since the weighted mean is calculated using the pixel values of the region 601 which is originally free from any noise component, noise components are attenuated.

Figure 6D:
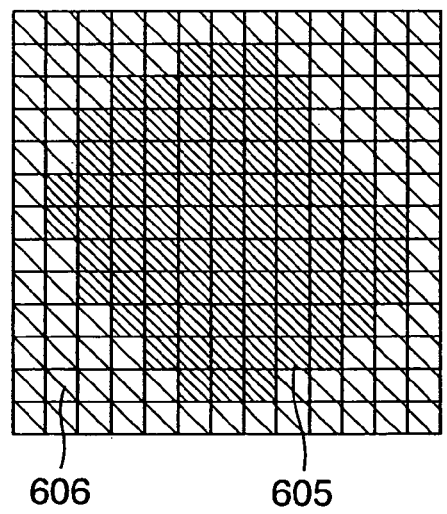
FIG. 6D shows an image state as a result of an LPF process which is applied to the image containing noise in FIG. 6A to have the range 603 of 9 pixels×9 pixels as a processing range.

FIG. 6D shows the state of an image as a result of the LPF process which is applied to the image containing noise shown in FIG. 6A using the 9×9 pixel range 603 as the processing range. In FIG. 6D, since the LPF processing range is sufficiently broader than the noise range, no region where the effect of the process is small is present unlike in FIG. 6C. As shown in FIGS. 6A, 6B, 6C, and 6D, the noise removal effect can be improved by assuring a larger processing range.

Figure 7A:
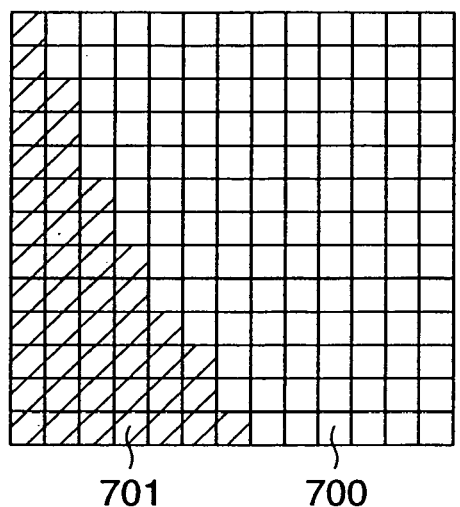
FIG. 7A shows an example of an edge portion present in an image.

FIG. 7A shows an example of an edge portion present in image information. Reference numeral 700 denotes a low-density region (a region indicated by white pixels in FIG. 7A); and 701, a high-density region (a region indicated by gray pixels in FIG. 7A). In the following description, the processing ranges 602 and 603 of two sizes shown in FIG. 6B are used.

Figure 7B:
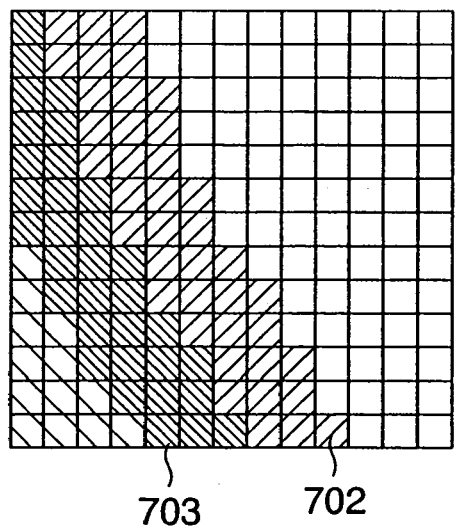
FIG. 7B shows an image state as a result of an LPF process which is applied to the image in FIG. 7A to have the range 602 of 5 pixels×5 pixels as a processing range.

FIG. 7B shows the state of an image as a result obtained of the LPF process is applied to the image of FIG. 7A using the 5×5 pixel range 602 as the processing range. A region 702 (hatched pixel region in FIG. 7B) indicates a region, the density values of which belonged to the low-density region 700 before the process, but which increase due to diffusion of the pixel values of the high-density region as a result of the LPF process. A region 703 (black pixel region in FIG. 7B) indicates a region, the density value of which belong to the high-density region 701 before process but decrease due to diffusion of pixel values as a result of the LPF process.

Figure 7C:
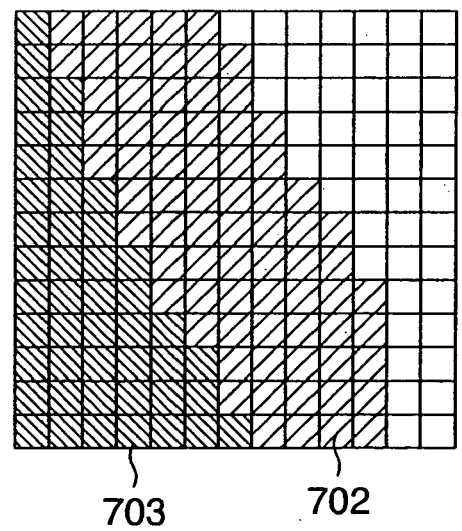
FIG. 7C shows an image state as a result of an LPF process which is applied to the image in FIG. 7A to have the range 603 of 9 pixels×9 pixels as a processing range.

FIG. 7C shows the state of an image as a result obtained of the LPF process is applied to the image of FIG. 7A using the 9×9 pixel range 603 as the processing range. In FIG. 7C, the ranges of the regions 702 and 703 where the pixel values are diffused broaden compared to FIG. 7B. The region 702 or 703 is visually recognized as a blur. For this reason, the region 702 or 703 is preferably narrower since it becomes harder to visually recognize as an adverse effect.

FIG. 8A shows an image to be processed. In FIG. 8A, reference numeral 800 denotes an isolated region in an image (a region having pixel values which are largely different from those of surrounding pixels); and 801, a non-isolated region. FIG. 8B is a graph showing a change in pixel value. In FIG. 8B, the abscissa plots one line bounded by the bold frame in FIG. 8A, and the ordinate plots the pixel values of pixels.

FIG. 8C shows the first example of weights used upon calculating the weighted mean in the LPF process, i.e., an example in which the pixel of interest has a large weight. FIG. 8D shows pixel values as a result of the LPF process which is applied to the image of FIG. 8A using the weights shown in FIG. 8C. FIG. 8E is a graph showing a change in pixel value. In FIG. 8E, the abscissa plots one line bounded by the bold frame in FIG. 8D, and the ordinate plots the pixel values of pixels.

FIG. 8F shows the second example of weights used upon calculating the weighted mean in the LPF process, i.e., an example in which the pixel of interest has a small weight. FIG. 8G shows pixel values as a result of the LPF process which is applied to the image of FIG. 8A using the weights shown in FIG. 8F. FIG. 8H is a graph showing a change in pixel value. In FIG. 8H, the abscissa plots one line bounded by the bold frame in FIG. 8G, and the ordinate plots the pixel values of pixels.

Upon comparison between FIGS. 8E and 8H as the results of two different LPF processes, the pixel values of pixels which neighbor the isolated region slightly increase, and those of the isolated region decrease slightly in the result shown in FIG. 8E. However, the width of the most isolated portion near the isolated region is w1 as in the image shown in FIG. 8A, and the image signal suffers less deterioration. For this reason, if the isolated region shown in FIG. 8B is an image as a unit which is to undergo noise removal, the adverse effect is relatively small.

On the other hand, in the result shown in FIG. 8H, the pixel values of pixels which neighbor the isolated region increase largely, while those of the isolated region decrease largely. Also, the width of the most isolated portion near the isolated region is w2 unlike in the image shown in FIG. 8A, and the large effect of the process appears. For this reason, if the isolated region in FIG. 8B corresponds to noise components, the processing effect is observed.

The noise removal effects and adverse effects with respect to the processing ranges and weights in the LPF process have been explained using FIGS. 6A, 6B, 6C, 6D, 7A, 7B, 7C, 8A, 8B, 8C, 8D, 8E, 8F, 8G, and 8H. On the other hand, the strength of noise, and visual conspicuity of the adverse effects after the process have different natures depending on the color of the processing region.

Noise shown in FIGS. 6A, 6B, 6C, and 6D, or noise like the isolated region in FIGS. 8A, 8B, 8C, 8D, 8E, 8F, 8G, and 8H especially becomes conspicuous when an image on which noise has already been superposed in a digital camera is amplified by a process such as luminance gain adjustment, saturation gain adjustment, or the like. A digital camera, which uses primary color filters, is designed to set a lower gain of an image signal after image sensing for a G component that has a higher contribution rate to a visually conspicuous luminance component among R, G, and B color components, since the amount of light to be obtained is increased by using a larger number of G filters than other color filters. However, as for R and B components, an image signal undergoes an amplification process to compensate for insufficient amounts of light.

Furthermore, in order to simulate a preferred color so as to vividly express, e.g., clear sky, especially, an R component often undergoes large gain adjustment. If large gain adjustment is made, noise components are amplified at the same time. For this reason, many noise components are often superposed on a blue region represented by clear sky or the like. Also, a dark portion of a night scene, shadowy scene, or the like with an insufficient amount of light undergoes noise amplification by gain adjustment, and many noise components are often superposed on such portion. Conversely, depending on the characteristics of an image input/output device, a pseudo edge is readily generated in a dark portion since overall pixel values are raised as a result of gain adjustment. As a result, an adverse effect often becomes conspicuous near the pseudo edge.

For the blue region on which many noise components are more likely to be superposed, the effect of the noise removal process must be increased to remove noise. As shown in FIGS. 6A, 6B, 6C, and 6D, the processing range is broadened for the blue range to increase the effect of the noise removal process. Also, weight parameters are changed, as shown in FIG. 8H, to enhance the influence of the process, thus allowing an effective noise removal process.

On the other hand, a person is visually very sensitive to a change in one's face. A person often sensitively detects even slight changes in fine wrinkles, three-dimensional patterns on a skin surface, and the like, and feels odd. Since the adverse effects are preferably minimized for a human face, a small size of the processing range is adopted for a flesh color region to reduce the adverse effects, as shown in the example of FIGS. 7A, 7B, and 7C. Also, weight parameters are changed, as shown in FIG. 8E, to reduce the influence of the process, thus allowing a noise removal process which suffers less visual adverse effects.

In this embodiment, the calculation range and weighting coefficients have been discussed as parameters to be changed. However, the present invention is not limited to those specific parameters.

As described above, the noise removal process according to this embodiment can determine a region with many noise components, and a region where adverse effects of the noise removal process are visually conspicuous, on the basis of the color around the processing region. As a result, the effects of the noise removal process can be improved while suppressing the adverse effects of the noise removal process.

Second Embodiment

The first embodiment has exemplified a case wherein the noise removal effects are improved while suppressing adverse effects, by changing processing parameters in correspondence with the color of the region of interest, upon executing the noise removal process using the LPF process. This embodiment will exemplify an effective noise removal process by changing processing parameters in correspondence with the color of the region of interest when another noise removal method is used.

An image processing apparatus according to this embodiment is substantially the same as the image processing apparatus according to the first embodiment, except for the arrangement of the individual noise removal unit 105 and parameters supplied from the parameter determination unit 104.

Figure 9:
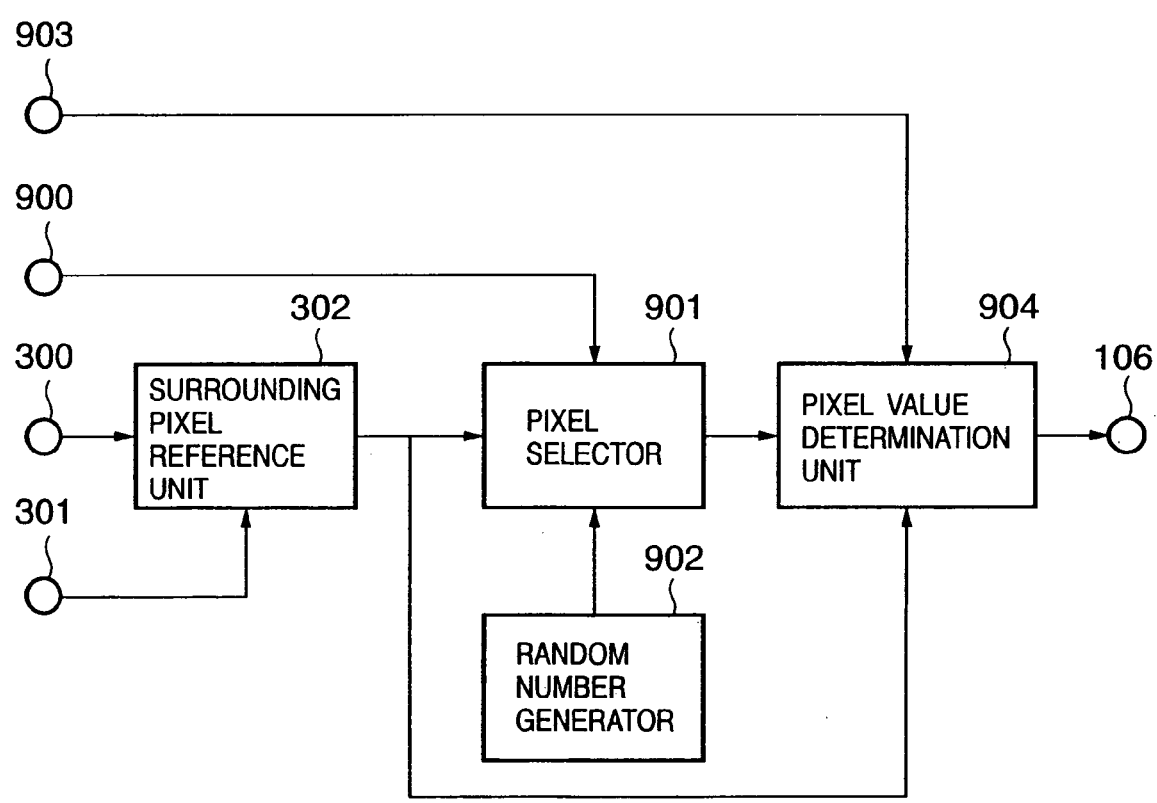
FIG. 9 is a block diagram showing the functional arrangement of an individual noise removal unit which executes a noise removal process using the noise distribution method, according to the second embodiment of the present invention.

FIG. 9 is a block diagram showing the functional arrangement of the individual noise removal unit 105 that executes a noise removal process using the noise distribution method. The same reference numerals denote the same parts as those in FIG. 3, and a description thereof will be omitted. The individual noise removal unit shown in FIG. 9 comprises input terminals 300, 301, 900, 903, surrounding pixel reference unit 302, pixel value selector 901, random number generator 902, and pixel value determination unit 904.

The input terminal 900 receives parameters which are supplied from the parameter determination unit 104 and are used in the pixel value determination unit 904. The pixel value selector 901 arbitrarily selects a pixel from the surrounding pixel reference unit 302 on the basis of a pseudo random number generated by the random number generator 902, and parameters input via the terminal 900, and reads out its pixel value. The input terminal 903 receives parameters which are supplied from the parameter determination unit 104 and are used in the pixel value determination unit 904.

The pixel value determination unit 904 calculates and determines the pixel value of a pixel of interest after a noise removal process using the parameters input via the input terminal 903, the pixel value of the pixel of interest, which is to undergo the noise removal process and is read out from the surrounding pixel reference unit 302, and the pixel value of the pixel selected by the pixel value selector 901.

Figure 10:
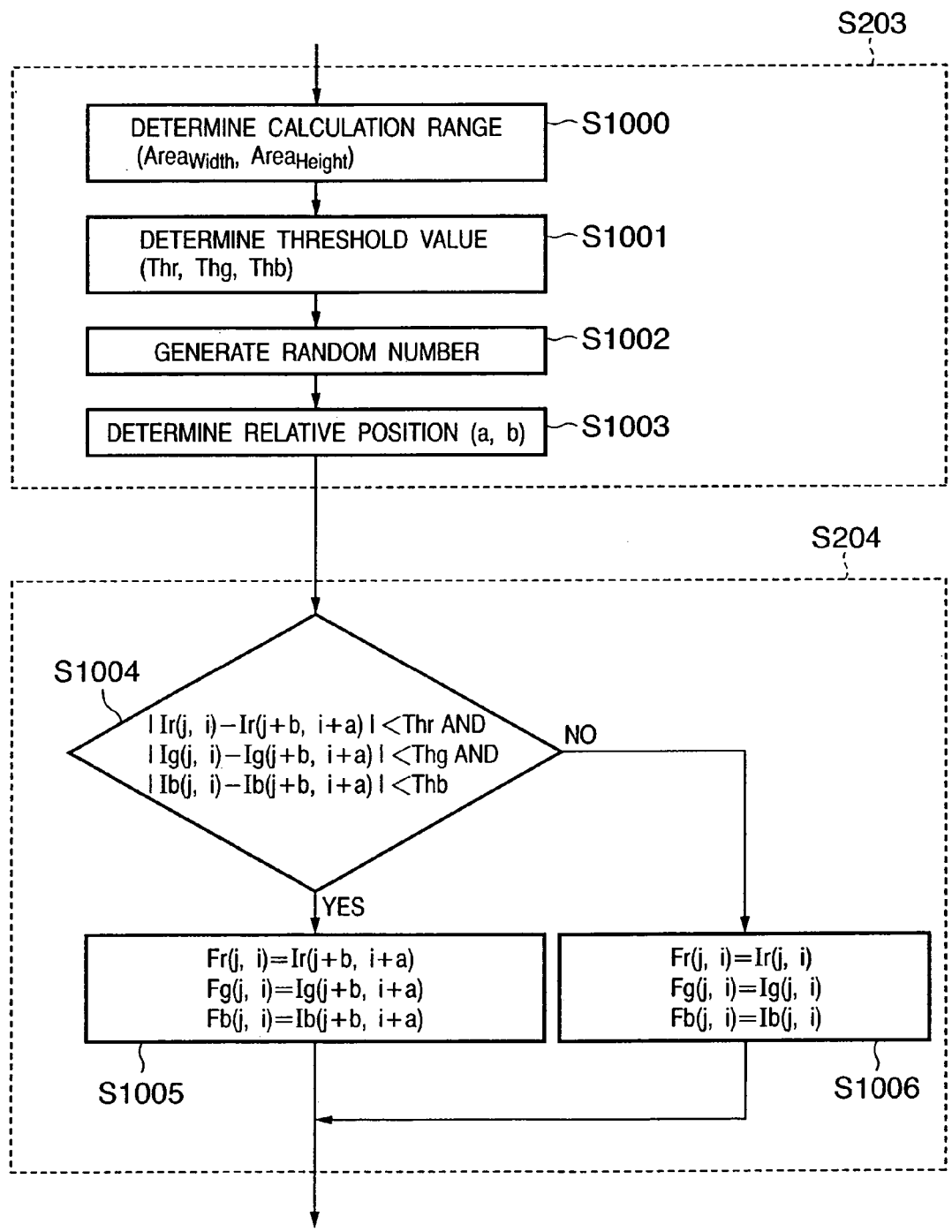
FIG. 10 is a flow chart of a noise removal process executed by an image processing apparatus according to the second embodiment of the present invention, when the individual noise removal unit according to the second embodiment of the present invention is used as the individual noise removal unit 105.

FIG. 10 is a flow chart of a noise removal process executed by the image processing apparatus according to this embodiment, when the individual noise removal unit according to this embodiment with the above arrangement is used as the individual noise removal unit 105. The noise removal process will be described below using the flow chart of FIG. 10. Note that ranges bounded by the broken lines in FIG. 10 respectively indicate the processes executed in steps S203 and S204, and the processes other than steps S203 and S204 are not shown in FIG. 10. That is, FIG. 10 is a flow chart showing details of the parameter determination process in step S203, and the noise removal process in step S204.

As in step S400, the parameter determination unit 104 obtains the size of an image to be processed (calculation range) (step S1000). In the following description, let Area$_{Width}$ be the horizontal size of the calculation range, and Area$_{Height}$ be its vertical size. Also, the parameter determination unit 104 determines threshold values Thr, Thg, and Thb used in subsequent processes for R, G, and B components on the basis of the color detection result of the color judgment-unit 103 (step S1001). The random number generator 902 generates a pseudo random number (step S1002). The pixel value selector 901 determines the values of variables a and b which indicate the horizontal and vertical relative positions from the pixel of interest, on the basis of the generated random number and the color detection result of the color judgment unit 103 (step S1003). As a determination method of a and b, for example, the random number generator 902 generates a pseudo random number.

Note that the values of variables a and b are determined not to exceed the size of the calculation range obtained in step S1000. For example, if the size of the calculation range is 9×9 pixels having the pixel of interest as the center, values a and b are set using a remainder calculation based on the generated random number to fall within the ranges $-4 \leq a \leq 4$ and $-4 \leq b \leq 4$.

With the processes in steps S1000 to S1003, parameters used in the subsequent processes can be determined.

A noise removal process using these parameters is executed. In the noise removal process, the following checking processes are made (step S1004) to see whether or not:

$|Ir(j, i)-Ir(j+b, i+a)|<Thr$ and $|Ig(j, i)-Ig(j+b, i+a)|<Thg$ and $|Ib(j, i)-Ib(j+b, i+a)|<Thb$ where Ir(j, i) is the pixel value of the R component, Ig(j, i) is the pixel value of the G component, and Ib(j, i) is the pixel value of the B component all of the pixel of interest located at a coordinate position (j, i). Also, |x| is the absolute value of x.

That is, the above checking processes check whether or not the absolute values of the differences between three, R, G, and B component values of a selected pixel arbitrarily selected from the calculation range, and those of the pixel of interest of become smaller than the threshold values. If all the three, R, G, and B components are smaller than the threshold values as a result of the above checking processes, the flow advances to step S1005, and the pixel values of the pixel of interest are updated by those of the selected pixel (step S1005). On the other hand, if not all the three, R, G, and B components are smaller than the threshold values, the flow advances to step S1006, and the pixel values of the pixel of interest are not updated.

Note that the parameters determined in step S1000 may have different values for R, G, and B components. In such case, the noise distribution process in steps S1002 to S1006 is executed using individual threshold values for individual calculation ranges for respective colors.

In the description of the above process, an image is made up of R, G, and B components. However, the above process may be applied to luminance and color difference components used in JPEG or the like, or complementary color components such as C, M, Y, and K components or the like used as ink colors in a printer or the like. Also, the detailed process for determining parameters in step S203 follows the flow chart shown in FIG. 5, as in the first embodiment.

Figure 11A:
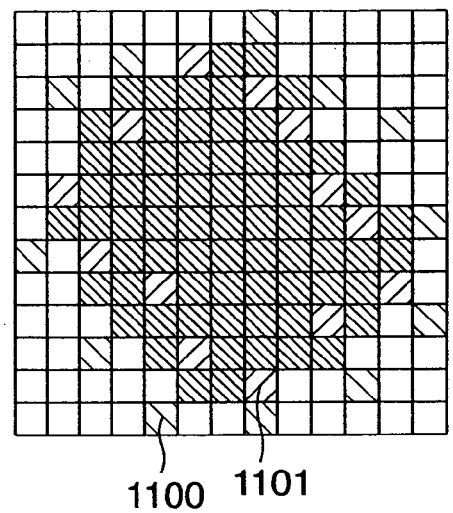
FIG. 11A shows an image state as a result of a noise distribution process which is applied to the image in FIG. 6A to have the range 602 of 5 pixels×5 pixels as a processing range.
Figure 11B:
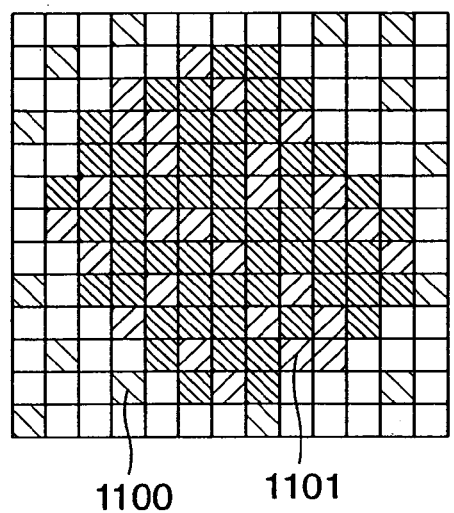
FIG. 11B shows an image state as a result of a noise distribution process which is applied to the image in FIG. 6A to have the range 603 of 9 pixels×9 pixels as a processing range.

The color of the region of interest, and the effects and adverse effects of the noise removal process will be described below. FIGS. 11A and 11B show the relationship between noise generated in the image shown in FIG. 6A, and the results of the noise distribution process. Also, the sizes of the regions 602 and 603 in FIG. 6B are used as those of the calculation range.

FIG. 11A shows an image state as a result of the noise distribution process which is applied to the image of FIG. 6A using the 5×5 pixel region 602 as the processing range. Referring to FIG. 11A, reference numeral 1100 denotes pixels, which belonged to the non-noise region 601 before the process, but to which the pixel values of the noise region are distributed as a result of the noise distribution process. Reference numeral 1101 denotes pixels, which belonged to the noise region 600 before the process, but which are replaced by the pixel values of the non-noise region 601 since the noise region is distributed as a result of the noise distribution process.

In FIG. 11A, since the processing region is smaller than the size of the noise region 600, the central portion of the noise region 600 undergoes a pixel substitution process within the noise region 600, and the obtained noise removal effect is insufficient. On the other hand, FIG. 11B shows an image state as a result of the noise distribution process which is applied to the image of FIG. 6A using the 9×9 pixel range 603 as the processing range.

In FIG. 11B, the process is done using the processing region which is large enough with respect to the size of the noise region 600. For this reason, the central portion of the noise region 600 undergoes pixel value substitution, and a cluster of noise components, which are readily visually detected, are distributed, thus obtaining a noise removal effect.

Figure 12A:
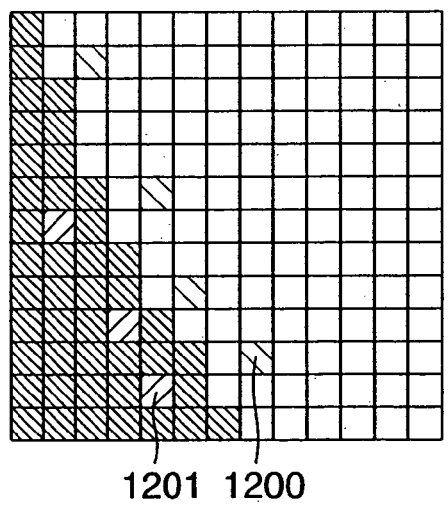
FIG. 12A shows an image state as a result of a noise distribution process which is applied to the image in FIG. 7A to have the range 602 of 5 pixels×5 pixels as a processing range.
Figure 12B:
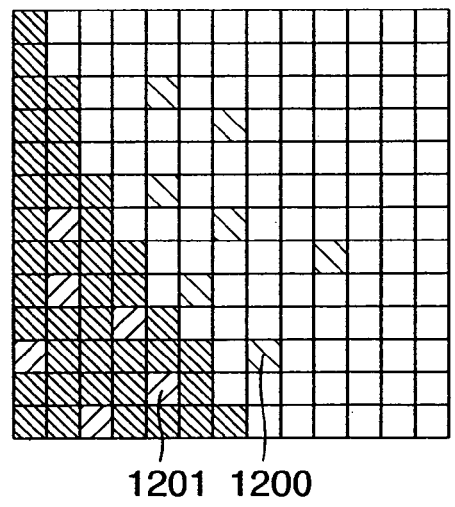
FIG. 12B shows an image state as a result of a noise distribution process which is applied to the image in FIG. 7A to have the range 603 of 9 pixels×9 pixels as a processing range.

FIGS. 12A and 12B show the relationship between an edge portion present in the image shown in FIG. 7A, and the results of the noise distribution process. In the following description, the sizes of the regions 602 and 603 in FIG. 6B are used as those of the calculation range. FIG. 12A shows an image state as a result of the noise distribution process which is applied to the image of FIG. 7A using the 5×5 pixel range 602 as the processing range.

In FIG. 12A, reference numeral 1200 denote pixels, which belonged to the low-density region 700 before the process, but to which the pixel values of the high-density region 701 are distributed as a result of the process. Reference numeral 1201 denotes pixels, which belonged to the high-density region 701 before the process, but to which the pixel values of the low-density region 700 are distributed as a result of the process. In FIG. 12A, since the processing range is relatively small, pixels are distributed only near the edge in the image region shown in FIG. 7A.

On the other hand, FIG. 12B shows an image state as a result of the noise distribution process which is applied to the image in FIG. 7A using the 9×9 pixel region 603 as the processing range. In FIG. 12B, since the processing range size is large, pixels are distributed even to pixels farther from the edge in the image region shown in FIG. 7A across the edge boundary. When pixels near the edge boundary are distributed over a broad range, the edge blurs, resulting in deterioration of the image quality. When the large processing range shown in FIG. 12B is applied to the image edge portion shown in FIG. 7A, the adverse effect of the process becomes visually conspicuous.

FIG. 13A shows an image to be processed. Reference numeral 1300 denotes an image region which has pixel values (pixel values=25 in FIG. 13A) different from those of a surrounding region. Reference numeral 1301 denotes a pixel region around the pixel region 1300, which has pixel values=20 as an example. Reference numeral 1302 denotes a pixel region around the pixel region 1300, which has pixel values=15 as an example. FIG. 13B is a graph showing a change in pixel value. In FIG. 13B, the abscissa plots one line bounded by the bold frame in FIG. 13A, and the ordinate plots the pixel values of pixels.

FIG. 13C shows an example of a formula that expresses a pixel value substitution condition used in the noise distribution process. In FIG. 13C, $P_{org}$ is the pixel value of a pixel of interest, and $P_{sel}$ is that of a selected pixel. In the formula of FIG. 13C, threshold value Th1=8, and this means that a pixel value is substituted if the absolute value of the difference between the pixel values of the pixel of interest and the selected pixel is equal to or smaller than 8.

FIG. 13D shows the result of the noise distribution process which is applied to FIG. 13A as the image to be processed on the basis of the formula in FIG. 13C. Referring to FIG. 13D, since the absolute values of the differences between the pixel values of pixels in the regions 1300 and 1301 in FIG. 13A become equal to or smaller than 8, pixel values are substituted. On the other hand, since the absolute values of the differences between the pixel values of pixels in the regions 1300 and 1302 become 10, no pixel value substitution is made. FIG. 13E shows pixel values in one line bounded by the bold frame in FIG. 13D.

FIG. 13F shows an example of another formula that expresses a pixel value substitution condition used in the noise distribution process. In FIG. 13F, threshold value Th2=12 unlike in FIG. 13C. FIG. 13G shows the result of the noise distribution process applied to FIG. 13A as the image to be processed on the basis of the formula in FIG. 13F. Referring to FIG. 13G, since not only the absolute values of the differences between pixel values of pixels in the regions 1300 and 1301 in FIG. 13A become equal to or smaller than 8, and the absolute values of the differences between pixel values of pixels in the regions 1300 and 1302 become 10, i.e., the absolute values of the differences between pixel values also become smaller than the threshold value, pixel values are substituted. FIG. 13H shows pixel values in one line bounded by the bold frame in FIG. 13G.

Upon comparison between FIGS. 13E and 13H as the results of the two different noise distribution processes, pixels on the left side of the graph in FIG. 13E undergo pixel value substitution, but those on the right side of the graph do not undergo pixel value substitution. That is, the shape of the image to be processed near the regions 1300 and 1302, which have the same condition as that on the right side of the graph, remains unchanged. When the region 1300 is an image, an image as a result of the noise removal process is preferably less modified. In case of the example shown in FIG. 13D or 13E, the shape of the region 1300 is not completely disturbed, and the adverse effect can be suppressed.

On the other hand, in FIG. 13H, pixel values are substituted irrespective of their positions along the abscissa, and the shape of the region 1300 is disturbed. For this reason, when the region 1300 corresponds to noise components, the processing effect is visible.

The noise removal effects and adverse effects with respect to the processing ranges and threshold values in the noise distribution process have been explained using FIGS. 11A and 11B, FIGS. 12A and 12B, and FIGS. 13A, 13B, 13C, 13D, 13E, 13F, 13G, and 13H. As has been explained in the first embodiment, the strength of noise, and visual conspicuity of the adverse effects after the process have different natures depending on the color of the processing region. For this reason, in this embodiment as well, the noise removal effect can be improved by setting parameters which broaden the processing range, those which set higher selection probabilities of pixel values for outer pixels within the processing region, those which set a higher threshold value, and so forth, when the processing region has a color with high noise level. On the other hand, the adverse effects due to the noise removal process can be suppressed by setting parameters which narrow down the processing range, those which set higher selection probabilities of pixel values within the processing region for pixels closer to the pixel of interest, those which set a lower threshold value, and so forth, when the processing region has a color that emphasizes the adverse effects.

Note that this embodiment has exemplified the calculation ranges and threshold values as parameters to be changed. However, the present invention is not limited to such specific parameters.

As described above, the noise removal process according to this embodiment can determine a region with many noise components, and a region where adverse effects of the noise removal process would be visually conspicuous on the basis of the color around the processing region. As a result, the effects of the noise removal process can be improved while suppressing the adverse effects of the noise removal process.

Third Embodiment

The first embodiment described above has exemplified a case wherein the noise removal process which can enhance its effect and can suppress its adverse effect is implemented by determining the processing ranges and weights used upon calculating the weighted mean on the basis of conspicuity of noise, and that of the adverse effect of the noise removal process depending on the color of the region of interest in the noise removal process using an LPF.

The present invention can be applied to an MF method that has been described above as a typical noise removal processing method in addition to the methods exemplified in the first and second embodiments. In the MF method, a median pixel value is selected from all pixel values within the processing range, and substitutes the pixel value of the pixel of interest. This method is particularly effective for spot noise which has very low correlation with surrounding pixels. In this embodiment as well, the same reference numerals denote the same items as those described above, and a description thereof will be omitted.

Figure 14:
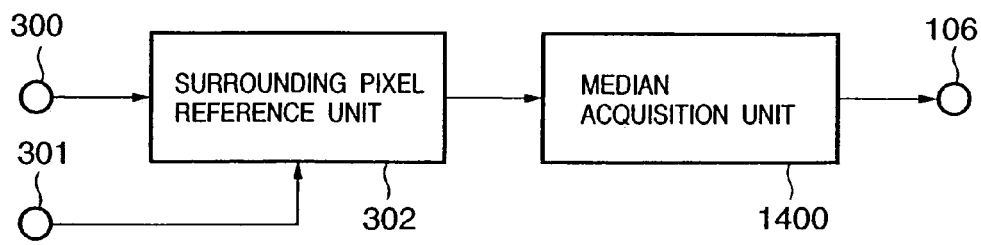
FIG. 14 is a block diagram showing the functional arrangement of an individual noise removal unit that executes a noise removal process using an MF, according to the third embodiment of the present invention.

FIG. 14 is a block diagram showing the functional arrangement of an individual noise removal unit which executes a noise removal process using an MF according to this embodiment. The same reference numerals in FIG. 14 denote the same parts as those in FIG. 3, and a description thereof will be omitted. The individual noise removal unit shown in FIG. 14 comprises input terminals 300 and 301, surrounding pixel reference unit 302, and median acquisition unit 1400. The individual noise removal unit with the arrangement of FIG. 14 executes a process for acquiring a median pixel value from all pixels within the processing range, and substituting this median pixel value as a new pixel value of the pixel of interest.

Figure 15:
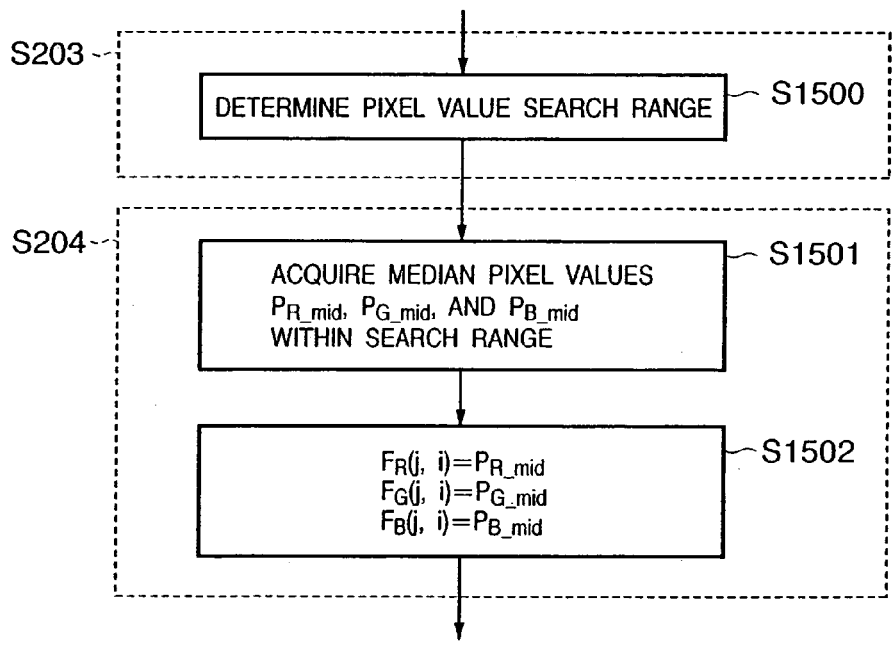
FIG. 15 is a flow chart of a noise removal process executed by an image processing apparatus according to the third embodiment of the present invention, when the individual noise removal unit according to the third embodiment of the present invention is used as the individual noise removal unit 105.

FIG. 15 is a flow chart of a noise removal process executed by an image processing apparatus according to this embodiment, when the individual noise removal unit according to this embodiment is used as the individual noise removal unit 105. The noise removal process will be described below using the flow chart of FIG. 15. Note that ranges bounded by the broken lines in FIG. 15 respectively indicate the processes executed in steps S203 and S204, and the processes other than steps S203 and S204 are not shown in FIG. 15. That is, FIG. 15 is a flow chart showing details of the parameter determination process in step S203, and the noise removal process in step S204.

As in step S400, the parameter determination unit 104 obtains the size of an image to be processed (calculation range) (step S1500) Then, the pixel values of pixels included in this calculation range are referred to, and R, G, and B median pixel values $P_{R\_mid}$, $P_{G\_mid}$, and $P_{B\_mid}$ are acquired from all the pixels (step S1501). Then, R, G, and B pixel values $F_R(j, i)$, $F_G(j, i)$, and $F_B(j, i)$ of the pixel of interest are substituted by the acquired median pixel values $P_{R\_mid}$, $P_{G\_mid}$, and $P_{B\_mid}$ (step S1502).

Note that parameters calculated in step S1500 may be changed to different values in correspondence with R, G, and B components.

In the description of the above process, an image is made up of R, G, and B components. However, the above process may be applied to luminance and color difference components used in JPEG or the like, or complementary color components such as C, M, Y, and K components or the like used as ink colors in a printer or the like.

When many noise components are produced and a narrow processing range is set, the MF process often selects a pixel value that shifts in the noise direction compared to those around the median pixel value near the original processing region as the median pixel value in the processing region. On the other hand, when a broad processing range is set, an edge gets into the processing region, and a desired median cannot often be obtained.

Even when the frequency of occurrence of noise is uniform in an image, a region where noise is conspicuous depends on the color of the region of interest. Also, conspicuity of the adverse effect of the noise removal process depends on the color of the region of interest, as described above.

This embodiment has exemplified the noise removal process using the MF method. When the color of the processing region emphasizes noise, the processing range is broadened, while when the color of the processing region emphasizes the adverse effect due to the noise removal effect, the processing range is narrowed down, thus implementing a noise removal process that can enhance the noise removal effect and can suppress the adverse effect.

In another method, the MF process may be done only when the pixel value of interest is isolated compared to those of surrounding pixels. In such case, a threshold value used upon determining if the pixel value of interest is isolated may be changed in correspondence with the color of the processing region.

Fourth Embodiment

The first to third embodiments have exemplified a case wherein various processing parameters are controlled to obtain desired effects and adverse effects of a noise reduction process by utilizing the fact that the conspicuity of noise and that of the adverse effect of the noise removal process vary with respect to an effective scheme in the noise removal process in accordance with the color of the processing region.

Figure 16:
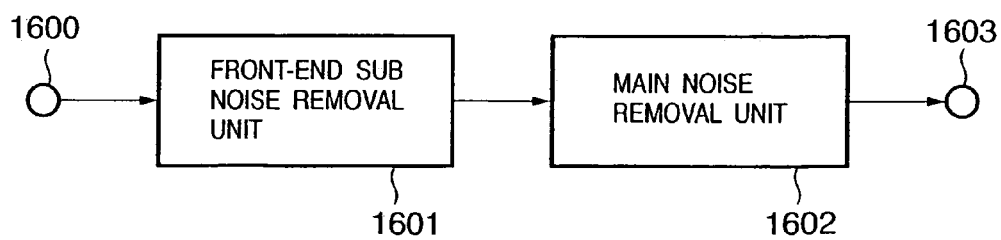
FIG. 16 is a block diagram showing the functional arrangement of an image processing apparatus which combines noise removal processes, according to the fourth embodiment of the present invention.

FIG. 16 is a block diagram showing the functional arrangement of an image processing apparatus which combines noise removal processes, according to this embodiment. The image processing apparatus shown in FIG. 16 comprises an input terminal 1600, front-end sub noise removal unit 1601, main noise removal unit 1602, and output terminal 1603.

The input terminal 1600 receives an image signal superposed with noise, and the input image is input to the next front-end sub noise removal unit 1601. The front-end sub noise removal unit 1601 executes a noise removal process for enhancing the noise removal effect of the main noise removal unit 1602. The main noise removal unit 1602 executes a main noise removal process. An image that has undergone the noise removal process is externally output via the output terminal 1603.

Note that each of the front-end sub noise removal unit 1601 and main noise removal unit 1602 comprises the functional arrangement shown in FIG. 1, and their individual noise removal units 105 execute different noise removal processes. In this embodiment, the individual noise removal unit (which comprises the arrangement shown in FIG. 14) included in the front-end sub noise removal unit 1601 executes the noise removal process using the MF method, and the individual noise removal unit (which comprises the arrangement shown in FIG. 9) included in the main noise removal unit 1602 executes the noise removal process using the noise distribution method.

Note that the flow chart of the noise removal process to be executed by the image processing apparatus with the above arrangement serially executes the processes that have been explained in the third and second embodiments, and a description thereof will be omitted.

Figures 17A, 17B, 17C, 17D, 18:
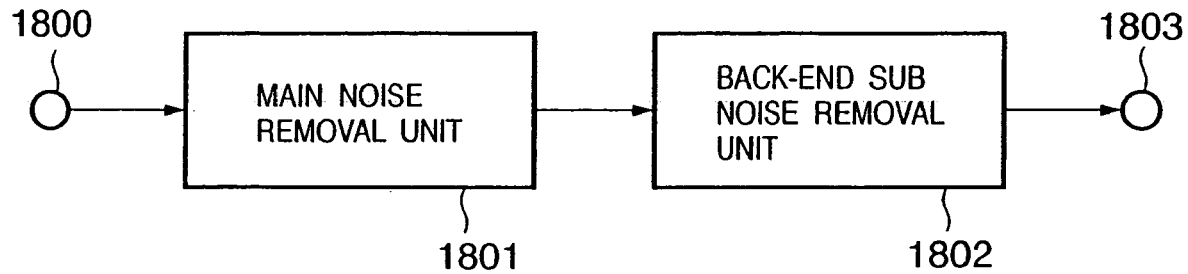
FIG. 17A shows an image on which noise components are superposed.
FIG. 17B shows a result of the noise distribution process of a main noise removal unit 1602, which is applied to the image in FIG. 17A.
FIG. 17C shows a result of the MF process of a front-end sub noise removal unit 1601, which is applied to the image in FIG. 17A.
FIG. 17D shows a result of the noise distribution process which is further applied to FIG. 17C.
FIG. 18 is a block diagram showing the functional arrangement of an image processing apparatus which combines noise removal processes, according to the fifth embodiment of the present invention.

FIG. 17A shows an image superposed with noise components, i.e., an image superposed with two different types of noise. Reference numeral 1700 denotes visually conspicuous noise, which corresponds to a pixel group having higher or lower pixel values than surrounding pixel values. Reference numeral 1701 denotes spot noise which has a pixel value having low correlation with surrounding pixels. On an image input by a digital camera or the like, a plurality of different types of noise are often superposed together. The two different types of noise described in this embodiment correspond to typical types of noise superposed on an image sensed by a digital camera. FIG. 17B shows the processing result obtained by applying the noise distribution method executed by the main noise removal unit 1602 to the image shown in FIG. 17A.

As has been described in the second embodiment, the noise distribution method does not substitute the pixel value of the pixel of interest, when the absolute value of the difference between the pixel values of the pixel of interest and selected pixel is large. Since spot noise has low correlation with surrounding pixel values, it often has a pixel value extremely different from surrounding pixel values. When many spot noise components 1701 are present, as shown in FIG. 17A, the probability of pixel value substitution lowers in the noise distribution method. As a result, the cluster noise 1700 that can be removed by the noise distribution method cannot often be sufficiently removed, as shown in FIG. 17B. FIG. 17C shows the processing result obtained by applying the MF process to be executed by the front-end sub noise removal unit 1601 to the image shown in FIG. 17A. Assume that the MF process of this embodiment is executed only when the pixel value of the pixel of interest is sufficiently different from those of surrounding pixels.

In FIG. 17C, the spot noise 1701 is removed by the MF process, and only the cluster noise 1700 remains unremoved. FIG. 17D shows the result obtained by further applying the noise distribution method to FIG. 17C. In FIG. 17D, the spot noise 1701 is removed, and the cluster noise 1700 is distributed, thus implementing effective noise removal.

In this embodiment, the MF process described in the third embodiment is applied as the front-end sub noise removal unit 1601. Also, the LPF process described in the first embodiment similarly has an effect to remove spot noise. For this reason, the LPF process may be applied as the front-end sub noise removal unit 1601 to obtain the same effect as in this embodiment.

The two different types of noise 1700 and 1701 shown in FIGS. 17A, 17B, 17C, and 17D are those which are generated by different generation causes in case of an image sensed by a digital camera. Also, these noise components have different influences of amplification of the aforementioned image processes and the like. For this reason, a region where each noise is visually conspicuous preferably undergoes a relatively strong process to reliably remove noise. Conversely, a region where the adverse effect of the noise removal process is conspicuous preferably undergoes a relatively weak process to suppress the adverse effect. As described above, the conspicuity of the noise and that of the adverse effect of the noise removal process depend on the color of the processing region. Furthermore, the conspicuity of the adverse effect differs depending on the contents of the noise removal process. For this reason, when a plurality of different noise removal processes are executed, processing parameters are preferably switched for each noise removal process in correspondence with the color of a region where noise to be removed by each noise removal process is conspicuous and that of a region where the adverse effect of each noise removal process is conspicuous. When the adverse effect is particularly conspicuous, parameters may be determined to skip execution of the process in the front-end sub noise removal unit 1601 or main noise removal unit 1602.

This embodiment has exemplified the noise removal process using the noise distribution method as the main noise removal unit, and the LPF or ME process as the front-end sub noise removal unit. However, the present invention is not limited to such specific embodiment, and a noise removal process based on another noise removal method may be executed in advance. That is, the present invention is effective for a combination of noise removal methods, which can improve the effect and suppress the adverse effect by such pre-process. Also, this embodiment has exemplified a case wherein only one front-end sub noise removal process is executed. When a large number of types of noise are superposed, a sub-noise removal process may be executed for each noise, and a plurality of different front-end sub noise removal processes may be executed in such case.

As described above, upon executing noise removal processes for an image superposed with a plurality of different noise components according to this embodiment, since the parameters of the removal methods suited to respective noise components are changed in correspondence with the color of the processing region, respective noise components can be effectively removed. Also, since a plurality of different noise removal methods are combined, noise components can be effectively removed from an image superposed with a plurality of different noise components.

Fifth Embodiment

The fourth embodiment has exemplified a case wherein the sub noise removal process that improves the effect of the main noise removal process is executed before the main noise removal process. This embodiment will exemplify a case wherein a back-end sub noise removal process that suppresses adverse effects is executed in combination after execution of the main noise removal process, so as to suppress the adverse effects produced as a result of the main noise removal process.

FIG. 18 is a block diagram showing the functional arrangement of an image processing apparatus which combines noise removal processes, according to this embodiment. The image processing apparatus shown in FIG. 18 comprises an input terminal 1800, main noise removal unit 1801, back-end sub noise removal unit 1802, and output terminal 1803.

The input terminal 1800 receives an image signal superposed with noise, and the input image is input to the next main noise removal unit 1801. The main noise removal unit 1801 executes a main noise removal process. The back-end sub noise removal unit 1802 executes a process that suppresses the adverse effects produced as a result of the process of the main noise removal unit 1801. An image that has undergone the noise removal process is externally output via the output terminal 1803.

Note that each of the main noise removal unit 1801 and back-end sub noise removal unit 1802 comprises the functional arrangement shown in FIG. 1, and their individual noise removal units execute different noise removal processes. In this embodiment, the individual noise removal unit (which comprises the arrangement shown in FIG. 9) included in the main noise removal unit 1801 executes the noise removal process using the noise distribution method, and the individual noise removal unit (which comprises the arrangement shown in FIG. 3) included in the back-end sub noise removal unit 1802 executes the noise removal process using the LPF method.

Note that the flow chart of the noise removal process to be executed by the image processing apparatus with the above arrangement serially executes the processes that have been explained in the second and first embodiments, and a description thereof will be omitted.

Figures 19A, 19B, 19C, 20:
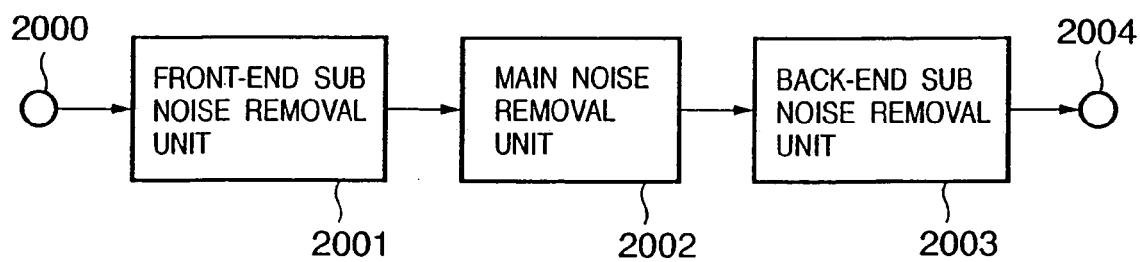
FIG. 19A shows an image on which noise components are superposed.
FIG. 19B shows a result of the noise distribution process of a main noise removal unit 1801, which is applied to the image in FIG. 19A.
FIG. 19C shows a result of the LPF process of a back-end sub noise removal unit 1802, which is further applied to the image in FIG. 19B.
FIG. 20 is a block diagram showing the functional arrangement of an image processing apparatus according to the sixth embodiment of the present invention.

FIG. 19A shows an image superposed with noise components. Reference numeral 1900 denotes a visually conspicuous cluster noise region which corresponds to a pixel group having higher pixel values than surrounding pixel values. Reference numeral 1901 denotes a non-noise region other than the cluster noise region 1900 in FIG. 19A.

FIG. 19B shows the processing result of the noise distribution method executed by the main noise removal unit 1801 for the image shown in FIG. 19A. Reference numeral 1902 denotes noise component pixels as remaining or distributed pixel values of noise components. Reference numeral 1903 denotes non-noise component pixels as remaining or distributed pixel values of non-noise components. In FIG. 19B, cluster noise components are distributed, and are hardly visually conspicuous, thus obtaining a certain noise removal effect.

In recent years, application software or a printer driver often executes an image process such as a color appearance correction process or saturation up process that changes pixel values. When only the process of the main noise removal unit 1802 is executed, the image shown in FIG. 19B is output. When the image shown in FIG. 19B undergoes the image process that changes pixel values, the differences between the noise component pixels 1902 and non-noise component pixels 1903 increase as a result of the process, thus producing granularity on the entire image.

FIG. 19C shows the result of the LPF process by the back-end sub noise removal unit 1803 for the image shown in FIG. 19B. In FIG. 19C, a smooth image is obtained since it has smaller differences between the noise component pixels 1902 and non-noise component pixels 1903 than those of the image shown in FIG. 19B. For this reason, even when the image shown in FIG. 19C undergoes the image process that changes pixel values, production of granularity is suppressed.

Granularity is more likely to be visually recognized with some specific on colors. For example, when a clear sky image suffers granularity even slightly, the user may feel visually odd. On the other hand, in case of human skin, the surface of which is not completely smooth and has many three-dimensional patterns, the granularity becomes less visually conspicuous. However, when three-dimensional patterns naturally present as image components are also smoothed as a result of the smoothing process, such image appears unnatural.

The conspicuity of granularity varies depending on images of interest. However, clear sky or human skin can be easily detected by detecting the color of the region of interest. Hence, when the granularity is visually conspicuous in correspondence with the color of the region of interest, parameters are determined to strongly apply the process of the back-end sub noise removal unit 1802, thus suppressing the adverse effect caused by the main noise removal unit 1801. When the parameters that execute a process for strongly suppressing the adverse effect are set in the back-end sub noise removal unit 1802, a relatively high threshold value used to determine pixel value substitution in the noise distribution method is set, so that substitution takes place easily, thereby also improving the noise removal effect.

On the other hand, in case of the region of interest in which granularity is not visually conspicuous, parameters are determined to weakly apply the process of the back-end sub noise removal unit 1802, thereby suppressing the adverse effect of the whole noise removal process. Also, in case of the color region where the differences between the pixel values of the noise component pixels 1902 and non-noise component pixels 1903 are sufficiently small, or they are visually inconspicuous, parameters may be determined to cancel the process of the back-end sub noise removal unit 1802. In case of a color region where noise itself is inconspicuous, parameters may be determined to weakly apply or cancel the process of the main noise removal unit 1801.

Note that this embodiment has exemplified a case wherein the LPF process described in the first embodiment is applied as the back-end sub noise removal unit 1802. However, the MF process described in the third embodiment also has an effect to remove spot noise. For this reason, when the LPF process is applied as the back-end sub noise removal unit 1802, the same effect as in this embodiment can be obtained.

This embodiment has exemplified the noise removal process using the noise distribution method as the main noise removal unit, and the LPF or MF process as the back-end sub noise removal unit. However, the present invention is not limited to such specific embodiment, and the object of the present invention can be achieved by various combinations of noise removal methods in which one noise removal method causes an adverse effect, and another noise removal method suppresses the adverse effect. Also, this embodiment has exemplified a case wherein only one back-end sub noise removal process is executed. However, when a plurality of adverse effects with different characteristics are produced, a plurality of back-end sub noise removal processes may be used.

As described above, upon executing noise removal processes for an image superposed with noise components according to this embodiment, the adverse effect caused by the noise removal process can be suppressed by combining a plurality of noise removal methods.

Sixth Embodiment

The fourth embodiment has exemplified a case wherein the effect of the main noise removal process is improved by executing the front-end sub noise removal process before the main noise removal process. The fifth embodiment has exemplified a case wherein the adverse effect of the main noise removal process is suppressed by executing the back-end sub noise removal process after the main noise removal process. When combinations of noise removal methods according to the fourth and fifth embodiments are used in combination, the effects of both the embodiments can be simultaneously obtained.

This embodiment will exemplify a case wherein the combinations of the noise removal methods described in the fourth and fifth embodiments are further combined.

FIG. 20 is a block diagram showing the functional arrangement of an image processing apparatus according to this embodiment. The image processing apparatus shown in FIG. 20 comprises an input terminal 2000, front-end sub noise removal unit 2001, main noise removal unit 2002, back-end sub noise removal unit 2003, and output terminal 2004.

The input terminal 2000 receives an image signal superposed with noise, and the input image is input to the next front-end sub noise removal unit 2001. The front-end sub noise removal unit 2001 executes a noise removal process for enhancing the noise removal effect of the main noise removal unit 2002. The main noise removal unit 2002 executes a main noise removal process. The back-end sub noise removal unit 2003 executes a process for suppressing the adverse effect produced as a result of the process of the main noise removal unit 2001. An image that has undergone the noise removal process is externally output via the output terminal 2004.

Note that the flow chart of the noise removal process executed by the image processing apparatus with the above arrangement can be considered as serial connection of the processes to be executed by the arrangements according to the fourth and fifth embodiments, since the functional arrangement of this image processing apparatus is realized by serially connecting the arrangements according to the fourth and fifth embodiments.

The noise removal process according to this embodiment is a combination of the fourth and fifth embodiments, and can simultaneously obtain the effects of both the embodiments. That is, the noise removal process according to this embodiment can enhance the effect of the main noise removal process, and can suppress the adverse effects caused by the main noise removal process.

ANOTHER EMBODIMENT

The objects of the present invention are also achieved by supplying a recording medium (or storage medium), which records a program code of a software program that can implement the functions of the above-mentioned embodiments to the system or apparatus, and reading out and executing the program code stored in the recording medium by a computer (or a CPU or MPU) of the system or apparatus. In this case, the program code itself read out from the recording medium implements the functions of the above-mentioned embodiments, and the recording medium which stores the program code constitutes the present invention.

The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the recording medium is written in a memory of the extension card or unit.

When the present invention is applied to the recording medium, that recording medium stores the program codes corresponding to the aforementioned flow charts.

As described above, according to the present invention, not only conspicuous noise can be effectively removed from an image superposed with noise, but also image deterioration can be suppressed.

According to the present invention, the adverse effects caused by the noise removal process can be effectively suppressed.

As many apparently widely different embodiments of the present invention can be made without departing from the spirit and scope thereof, it is to be understood that the invention is not limited to the specific embodiments thereof except as defined in the claims.

What is claimed is:

1. An image processing apparatus comprising:
   judgment means for judging a color of an image for each region having a predetermined size in an image superposed with noise;
   determination means for determining, for each region, a parameter for a noise removal process in correspondence with a color determined by said judgment means; and
   control means for controlling execution of the noise removal process, for each region in accordance with a corresponding parameter determined by said determination means,
   wherein said control means sets a region consisting a pixel of interest and its surrounding pixels in the image, selects randomly a pixel used for comparing with the pixel of interest from the surrounding pixels, determines a renewed pixel value of the pixel of interest according to a pixel value of the selected pixel if an absolute value of a difference between a pixel value of the pixel of interest and a pixel value of the selected pixel is equal to or less than a threshold value, and executes the noise removal process by updating a pixel value of the pixel of interest to the renewed pixel value.

2. The apparatus according to claim 1, wherein said determination means determines information indicating a size of a region which is to undergo the noise removal process, and also determines parameters used in a filtering process.

3. The apparatus according to claim 1, wherein said determination means determines information indicating a size of a region which is to undergo the noise removal process, and also determines parameters used in a noise distribution method.

4. The apparatus according to claim 1, wherein said control means controls execution of a process as one or a combination of a noise reduction process using a low-pass filter, a noise reduction process using a noise distribution method, and a noise reduction process using a median filter.

5. A program stored on a computer-readable medium for execution to control a computer to function as an image processing apparatus of claim 1.

6. A computer readable storage medium storing a program of claim 5.

7. An image processing method comprising:
   a judgment step of judging a color of an image for each region having a predetermined size in an image superposed with noise;
   a determination step of determining, for each region, a parameter for a noise removal process in correspondence with a color determined in the judgment step; and
   a control step of controlling execution of the noise removal process for each region in accordance with a corresponding parameter determined in the determination step,
   wherein said control means sets a region consisting a pixel of interest and its surrounding pixels in the image, selects randomly a pixel used for comparing with the pixel of interest from the surrounding pixels, determines a renewed pixel value of the pixel of interest according to a pixel value of the selected pixel if an absolute value of a difference between a pixel value of the pixel of interest and a pixel value of the selected pixel is equal to or less than a threshold value, and executes the noise removal process by updating a pixel value of the pixel of interest to the renewed pixel value.

* * * * *

UNITED STATES PATENT AND TRADEMARK OFFICE
CERTIFICATE OF CORRECTION

PATENT NO. : 7,177,463 B2
APPLICATION NO. : 11/297417
DATED : February 13, 2007
INVENTOR(S) : Kusakabe et al.

It is certified that error appears in the above-identified patent and that said Letters Patent is hereby corrected as shown below:

COLUMN 2

Line 63, "hot" should read --not--.

COLUMN 3

Line 27, "color" should read --color of--.
    Line 65, "show" should read --shows--.

COLUMN 7

Line 34, "(step S.206)." should read --(step S206).--.
    Line 40, "(step S208)" should read --(step S208).--.

COLUMN 9

Line 2, ""a"s." should read --"a" s).--.
    Line 53, "pixel," should read --pixel--.

COLUMN 11

Line 36, "Rand" should read --R and--.

COLUMN 13

Line 44, "all of the pixel" should read --of all of the pixels--.
    Line 50, "of" should be deleted.

COLUMN 17

Line 15, "(step S1500)" should read --(step S1500).--.

COLUMN 19

Line 45, "ME process" should read --MF process--.

UNITED STATES PATENT AND TRADEMARK OFFICE
CERTIFICATE OF CORRECTION

PATENT NO. : 7,177,463 B2
APPLICATION NO. : 11/297417
DATED : February 13, 2007
INVENTOR(S) : Kusakabe et al.

It is certified that error appears in the above-identified patent and that said Letters Patent is hereby corrected as shown below:

COLUMN 21

Line 14, "on" should be deleted.
Line 61, "limited-to" should read --limited to--.

Signed and Sealed this

Thirtieth Day of October, 2007

JON W. DUDAS
*Director of the United States Patent and Trademark Office*